United States Patent [19]

Ibaraki et al.

[11] Patent Number: 5,078,785
[45] Date of Patent: Jan. 7, 1992

[54] METHOD OF OPERATING IN-BATH SMELTING REDUCTION FURNACE

[75] Inventors: Tetsuharu Ibaraki; Michitaka Kanemoto; Masao Yamauchi; Yoshihiko Sakamoto, all of Sakai, Japan

[73] Assignee: Nippon Steel Corporation, Tokyo, Japan

[21] Appl. No.: 578,010

[22] Filed: Sep. 4, 1990

[30] Foreign Application Priority Data

| Sep. 4, 1989 | [JP] | Japan | 1-227554 |
| Oct. 27, 1989 | [JP] | Japan | 1-280459 |
| Mar. 28, 1990 | [JP] | Japan | 2-76828 |

[51] Int. Cl.⁵ ............................................. C21B 5/35
[52] U.S. Cl. ........................................ 75/386; 75/532; 75/538; 75/552
[58] Field of Search .................. 75/386, 552, 532, 538

[56] References Cited

FOREIGN PATENT DOCUMENTS

| 61-213310 | 9/1986 | Japan. |
| 61-221322 | 10/1986 | Japan. |
| 62-224619 | 10/1987 | Japan. |
| 62-230908 | 10/1987 | Japan. |
| 2042592 | 9/1980 | United Kingdom ............ 75/386 |

Primary Examiner—Melvyn J. Andrews
Attorney, Agent, or Firm—Wenderoth, Lind & Ponack

[57] ABSTRACT

A method of operating an in-bath smelting reduction furnace comprises the step of forming a slag zone in an in-bath smelting reduction furnace supplied with oxygen through a top lance and with agitation gas by bottom bubbling through tuyeres below the metal bath surface, and the step of controlling the carbon material supply rate, the oxygen supply rate and the ore supply rate so as to maintain the apparent density of the slag within a prescribed range.

8 Claims, 16 Drawing Sheets

METHOD OF OPERATING IN-BATH SMELTING REDUCTION FURNACE

BACKGROUND OF THE INVENTION

1. Field of the Invention

The present invention relates to a method of operating an in-bath smelting reduction furnace.

2. Description of the Prior Art

In the in-bath smelting reduction method, a large amount of slag is caused to be present in the furnace as a medium for reducing molten ore. Ore supplied from the top or bottom of the furnace is melted into the metal bath or the slag in the furnace and is incorporated into the slag as iron oxides. The metal bath and slag are agitated to bring the iron oxides into contact with carbon present in the metal bath and carbon materials present in the slag in the form of coke or char, thereby reducing the iron oxides and producing hot metal.

The reduction of the ore requires a large amount of reduction heat. In the in-bath smelting reduction method, this heat is obtained by supplying oxygen or oxygen-containing gas into the furnace for burning fuel separately supplied thereto. As the fuel there are used materials containing carbon or hydrocarbons, such coal, coke and carbonized petroleum residue.

The main roles played by the slag in in-bath smelting reduction are that of shielding the hot metal bath from the oxygen, thereby preventing re-oxidization of the metal and promoting the reduction reaction in the slag, and that of circulating in the furnace so as to supply the combustion heat effectively to all parts of the furnace.

On the other hand, the carbon material suspended in the slag serves as a reducing agent for the molten iron oxides present in the slag and as a medium for conducting the combustion heat. Further, the carbon materials work to suppress the excessive foaming of the slag which is apt to occur because of the tendency of fine bubbles of gas generated in the slag to coalesce and, as a result, they help to prevent "slopping" (overflow of foamed slag at the furnace mouth), a phenomenon that makes continued operation impossible.

JP-A-62-224619, for example, discloses a method for efficiently conducting in-bath smelting reduction by supplying carbon material consisting of lump and powder materials mixed at a prescribed ratio to the slag so as to produce a high-temperature and strongly reductive atmosphere.

As will be understood from this, the amount of carbon material in the slag is highly important to stable in-bath smelting reduction operation. A number of methods have been proposed for measuring the slag carbon material content.

In one of these methods the amount of carbon material present in the slag is estimated from the residual C content of the furnace continuously calculated as the difference between the amount of C in the carbon material etc. supplied to the furnace and the total amount of C in the off-gas from the furnace. However, with this method a large discrepancy tends to arise between the actual and estimated amounts of carbon materials in the slag over long-term operation. This is due to the fact that there is ordinarily a 0.1–1% error in the measured value of supplied materials, a similar degree of error in the calculated off-gas flow rate and also some degree of error in the analysis of the components, and these errors accumulate over the passage of time.

In addition, the char formed when the volatile matter is driven out of the coal in the furnace is in large part made up of relatively small particles which tend to be entrained and carried off by the generated gas at the rate of at least 3% and, in some cases, up to 15%, and this also affects the amount of carbon material in the furnace. Since this rate of entrainment cannot be calculated instant by instant, such entrained carbon material also introduces a large error factor into the measurement of the carbon material present in the slag.

It is thus very difficult to maintain the carbon material content of the slag constantly at the ideal level so that it frequently becomes too high or too low, which gives rise to operational problems that will now be discussed.

When the carbon material content of the slag is insufficient, the slag swells excessively, giving rise to slopping so that the slag running over at the furnace mouth makes it impossible to continue the operation. On the other hand, when the carbon material content is excessive, the fluidity of the slag containing the carbon material is hindered and the excess carbon material reacts again with the combustion gas, reducing the gas and lowering the post combustion ratio. This means that the amount of heat generated per unit weight of the coal decreases and is found to cause a worsening of the unit consumption of coal and oxygen.

Thus when the carbon material of the slag cannot be maintained at an appropriate level, it either becomes impossible to continue the in-bath smelting reduction operation or becomes impossible to produce hot metal economically at a good unit consumption of coal and oxygen.

JP-A-61-221322 discloses a method in which post combustion heat is transferred to the slag in a converter-type vessel and the slag bath is agitated by gas for transferring the aforesaid heat to the molten metal. The agitating method used for promoting the heat transfer involves blowing gas into the slag and the molten metal.

JP-A-61-213310 discloses a method for increasing heat utilization efficiency when in-bath smelting reduction is carried out in a converter-type vessel that can be top blown. This is accomplished by establishing the conditions of: an amount of slag of not less that 250 kg/t, blowing bottom-blown gas at a rate accounting for 3–40% of the total amount of gas supplied, and maintaining the MgO +$Al_2O_3$ content of the slag at not more than 23%.

These conventional techniques focus solely on operation for improving the rate of heat transfer and the reaction rate and are based on the simple concept that it suffices to achieve appropriate slag agitation. They betray inadequate attention to factors other than slag agitation, such as control of the agitation by bottom bubbling to within an appropriate range, suppression of the amount of dust generated, and the like.

Moreover, since research into the in-bath smelting reduction method has conventionally been conducted using very small experimental furnaces in the 1 to 10-ton range, the agitation gas flow rate per tuyere has been quite small, specifically in the vicinity of several tens to 100 $N^3/h$. As a result, the effect of increasing the gas flow rate per tuyere was completely unknown and no solutions were available for the problems that would arise when bottom-blown gas is introduced at a large flow rate, as is indispensable in the case of a large furnace.

As was pointed out earlier, the suspension of carbon materials in the slag is important in an operation using the in-bath smelting reduction method. Ordinarily, the amount of carbon material suspended is equivalent to 10-100 wt% based on the weight of the slag. However, this material tends to be entrained by the furnace gas and carried off, with up to 15-20% of the charged coal sometimes leaving the furnace in this manner. This loss of carbon material not only increases the unit consumption of the carbon material but also increases the risk of slopping because of the lower percentage of carbon material present in the slag.

A particular problem is the slopping that occurs when the carbon material dust loss becomes so large as to excessively reduce the percentage of carbon material present in the slag. In the worst cases, slopping will occur a mere 30 - 40 min after the start of operation and make further operation impossible. Because of this, there has been felt a particularly strong need for a method capable of reducing loss of carbon materials by furnace gas entrainment. Current in-bath smelting reduction furnaces employ refractory of the $MgO-Cr_2O_3$, MgO-C or $Al_2O_3$ type. At the lower part of the furnace (which is immersed in the metal bath or the slag bath), the operating temperature is relatively low (about 1500 C) but the agitating force of the bottom-blown gas is large, resulting in a refractory wear rate of about 1-4 mm/h. At the top of the furnace (where the gas burns), the high post combustion ratio raises the gas temperature to 1700°-2000 ° C. or even higher. The refractory at this portion is further subjected to erosion by slag splashing. As a result, the refractory wear rate is high, today generally in the range of 3-10 mm/h.

For the in-bath smelting reduction method to be cost-competitive with the coke oven-blast furnace process, it is considered that the refractory wear rate must be reduced to 0.5-1 mm/h as an immediate target value.

The major cause for refractory wear is that caused by heat so that it should be possible to reduce the wear rate by lowering the operating temperature. JP-A-62-230908 discloses a low-temperature operating method in which dephosphorization is promoted during operation by maintaining the C content of the hot metal over 3.5% and maintaining the iron tapping temperature at least 200° C. higher than the liquidus but not higher than 1450° C.

SUMMARY OF THE INVENTION

One object of the invention is to provide a method of operating an in-bath smelting reduction furnace wherein the carbon material content of the slag in the in-bath smelting reduction furnace can be accurately ascertained, thus enabling highly economical operation at high productivity.

Another object of the invention is to provide a method of operating an in-bath smelting reduction furnace wherein the generation of iron dust and carbon material dust is reduced and the post combustion ratio and the heat transfer efficiency are high.

Still another object of the invention is to provide a method of operating an in-bath smelting reduction furnace wherein the refractory wear rate is suppressed.

DETAILED DESCRIPTION OF THE INVENTION

In the in-bath smelting reduction method, the carbon material in the slag plays an important role with respect to the operation and reaction.

Focusing their attention on one particular aspect of the role of the slag carbon material content, that of suppressing slag swelling, the inventors conducted a study on the relationship between the slag carbon material content and the state of slag swelling (apparent slag density).

More specifically, taking note of the fact that in the in-bath smelting reduction method the state of slag swelling is determined by the percentage of carbon material in the slag, they surmised that it might be possible, in reverse, to ascertain the slag carbon material content from the state of slag swelling, namely from the height of the slag.

They therefore conducted a study on the relationship between the slag and the carbon material in in-bath smelting reduction. Their findings are summarized in the following.

Slag swelling is determined by two factors: (a) the rate at which the CO gas generated by the reduction of iron oxides passes through the slag bath surface per unit area thereof ($Nm^3/h/m^2$) and (b) the carbon material content of the slag. Therefore, if the slag thickness is measured and the average density of the slag zone at this time is found, it is then possible to determine the carbon content of the slag from this average density and the flow rate of the reduction gas from the iron oxide metal.

For elucidating the causes governing slag foaming, slag density measurements were conducted in a small furnace. As a result, it was discovered that the slag foaming state is determined by the flow rate of the CO gas generated by ore reduction per unit cross-sectional area of the furnace at the slag zone and the ratio at which carbon material is present in the slag.

Figure 2:
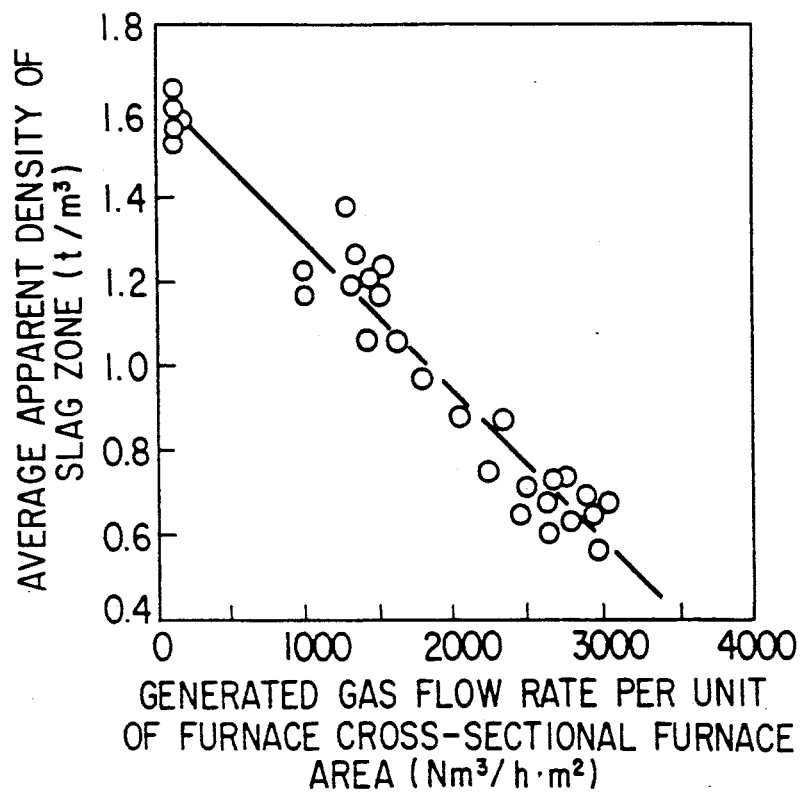
FIG. 2 is a graph showing the relationship between average slag density and gas flow rate.
Figure 3:
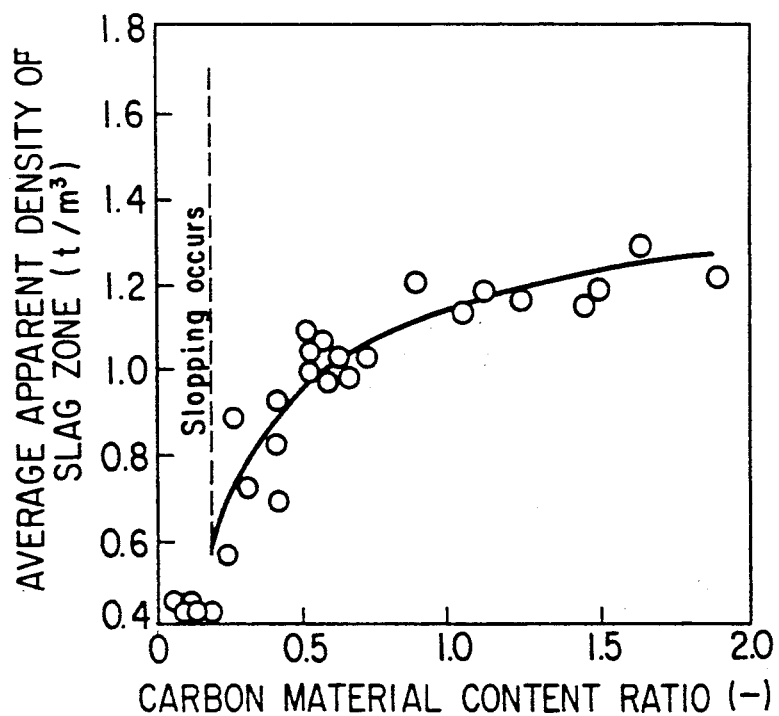
FIG. 3 is a graph showing the relationship between average slag density and carbon material content.
Figure 4A:
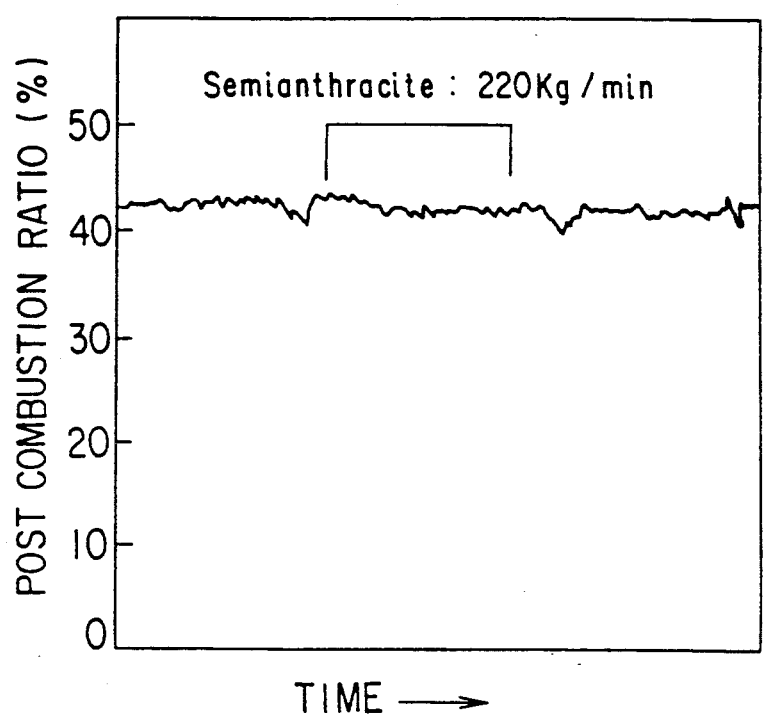
FIGS. 4(a), (b), (c) and (d) are graphs showing change in carbon material post combustion ratio with operation time.
Figure 4B:
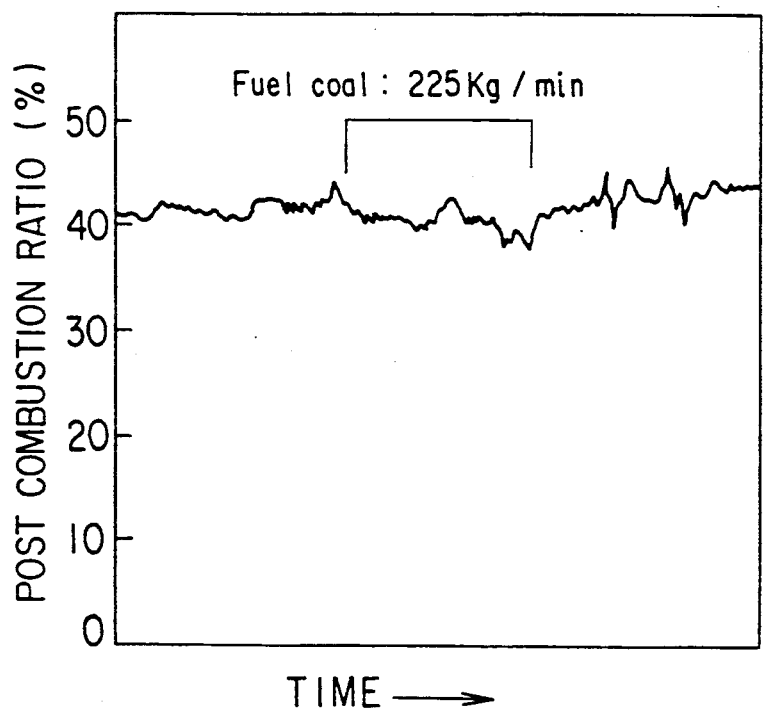
Figure 4C:
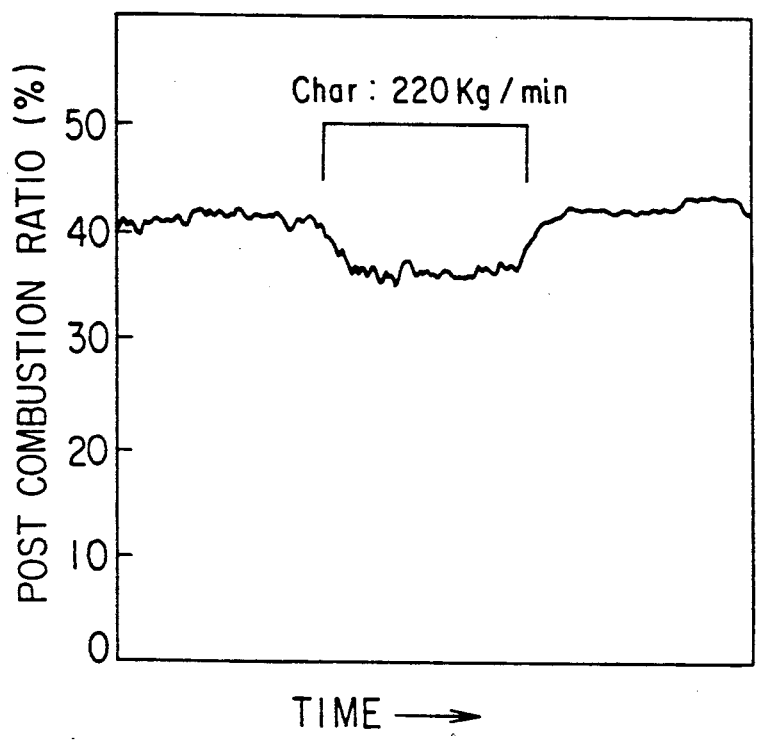
Figure 4D:
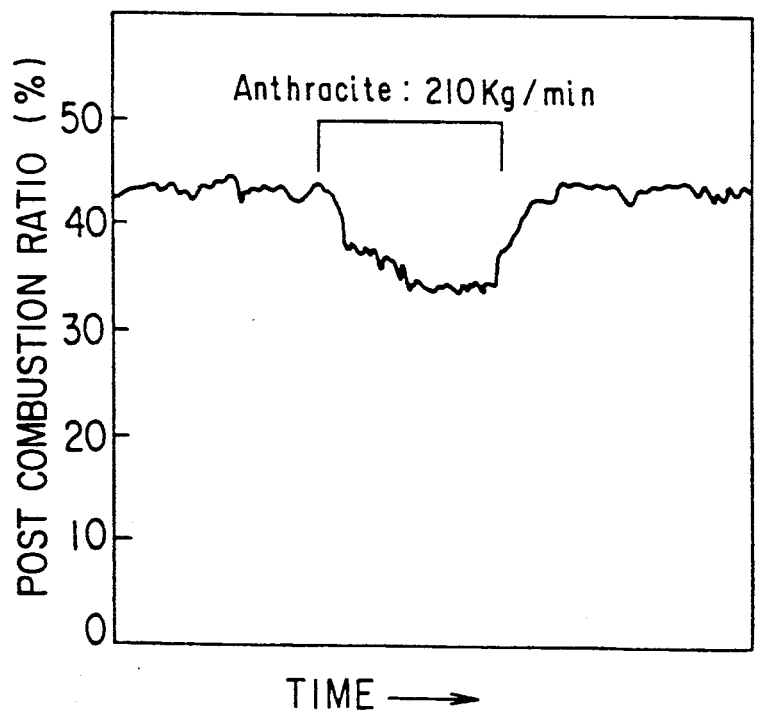

Specifically, the height of the foamed slag becomes greater and the average slag density becomes lower in proportion as the amount of CO gas generated by ore reduction increases and in proportion as the carbon material content of the slag decreases. The results of the measurements are summarized in FIG. 2 in terms of the average slag density and the gas flow rate and in FIG. 3 in terms of average slag density and carbon material content ratio.

The principle by which the carbon content of the slag is determined based on the results of this experiment will now be explained.

First the slag density is measured. This can be done, for example, by first measuring the slag height while in-bath smelting reduction is in progress using an electrically conductive slag sensor fitted on the tip of a so-called sub-lance. It is then possible to calculate the apparent density of the slag from the weight of the slag in the furnace at that time and the volume of the slag zone calculated from the measured height and the geometry of the furnace.

Next the flow rate of the CO gas generated by ore reduction per unit cross-sectional area of the furnace at the slag zone is calculated from the rate at which ore is being supplied to the in-bath smelting reduction furnace at that time and the oxygen content of this ore.

The carbon content of the slag at that time can then be obtained from the two calculated values and the relationship, determined experimentally beforehand, among slag swelling, the slag carbon material content and the CO flow rate per unit area.

The inventors determined the appropriate slag carbon material content during in-bath smelting reduction operation by the following method.

First, for determining the condition under which a problem arises owing to insufficient carbon material content, they discontinued supply of carbon material during in-bath smelting reduction operation so as to allow the carbon material in the slag to be consumed and noted the carbon material content limit on the low content side beyond which operational problems occurred. In this way they learned that slopping occurs when the weight of the carbon material in the slag falls below 10% of the weight of the slag or when the total surface area of the carbon material falls below 20 $m^2$/t-slag. That is to say, the lower limit of the slag carbon material content in the in-bath smelting reduction operation is 10% of the weight of the slag or the amount of carbon material which provides a total surface area of 20 $m^2$/t-slag.

For determining the carbon material content limit on the high content side, an experiment was conducted in which coal was supplied to the furnace at a rate higher than that determined by the material balance. In this way it was found that the transfer efficiency of the post combustion heat starts to worsen when the weight of the carbon material in the slag reaches 200% of the slag weight.

From these experiments it was thus learned that it is preferable to control the carbon material content of the slag to fall between 10% and 200% based on the weight of the slag. The most effective method for determining the carbon material content of the slag is the method based on measurement of the apparent slag density explained earlier.

Specifically, it is determined by measuring the state of slag swelling whether the amount of carbon material in the slag is insufficient or excessive. If it is found to be excessive, the coal supply rate is reduced to thereby reduce the amount of carbon material present to the appropriate level. If it is found to be insufficient, a carbon material with low volatile matter content such as coke, char or anthracite is supplied to the furnace to bring the carbon material content in the furnace up to the appropriate level.

Figure 1:
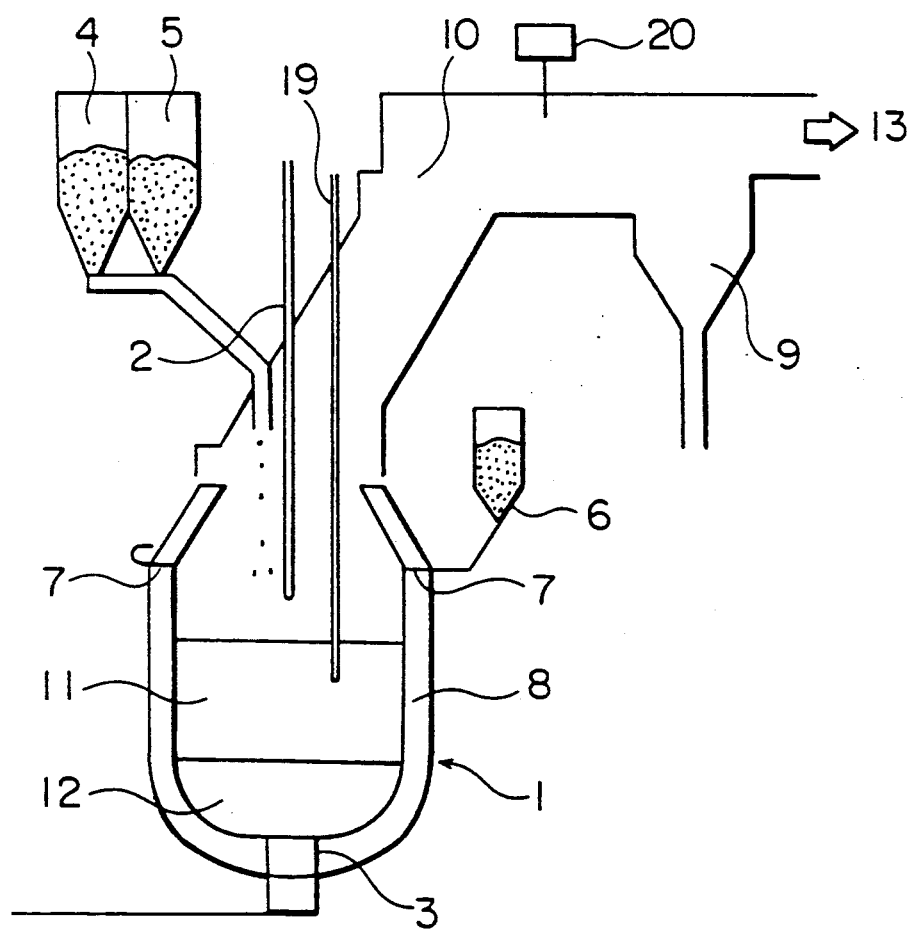
FIG. 1 is a sectional view of a system for explaining operation according to one aspect of the method of the present invention.

As shown in FIG. 1, during operation of the in-bath smelting reduction furnace, a bath of molten metal 12 and a bath of slag 11 form at the lower part of the furnace constituted of a furnace body 1 lined with refractory 8. The temperature of the hot metal and slag is about 1400–1700° C. When iron ore is supplied into the furnace in this state, the iron oxides therein are melted and the molten iron oxides are then reduced by carbon materials present in the slag in the form of coke or char and by dissolved carbon in the hot metal, thus producing additional hot metal.

Ore can be supplied in different ways, such as by dropping from a hopper situated above the furnace, by injection from the furnace side wall and by injection into the slag or hot metal. As a typically used method, FIG. 1 shows the case where the ore is supplied from a hopper 5 located above the furnace.

For compensation of the reduction heat and the sensible heat of the product, oxygen (oxygen-rich air or heated air will also suffice) is supplied to the hot metal and to the carbon materials in the slag in the furnace from a top lance 102. The supplied oxygen reacts with the coal and the dissolved carbon in the hot metal to produce heat. The gases generated by reaction of oxygen with carbon and coal also undergo combustion reaction, producing additional heat. The first-mentioned reaction is referred to as primary combustion and the latter reaction as post combustion.

Further, for promoting the melting and reduction reaction of the ore and heat transfer thereto, gas for agitation is supplied through tuyeres 103 at the bottom of the furnace. In view of the purpose of this gas agitation, there is no particular limitation on the kind of gas used. Ordinarily, nitrogen, argon, oxygen or a hydrocarbon such as propane is employed.

Figure 5:
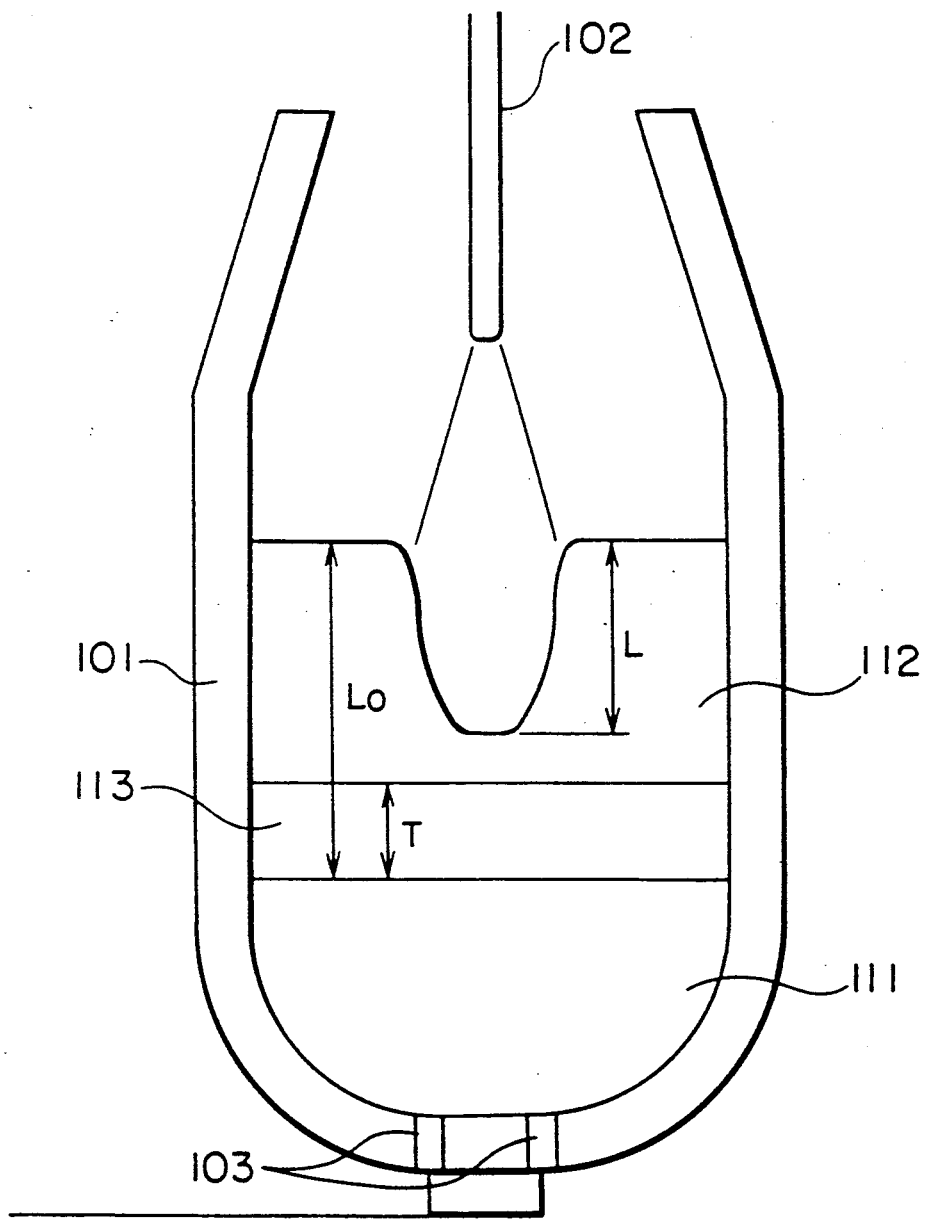
FIG. 5 is a detailed view of the interior of an in-bath smelting reduction furnace, showing the relationship among the slag thickness, the oxygen jet induced slag cavity, and the slag iron condensed zone.

The supply of coal is carried out so as to maintain the carbon balance in the in-bath smelting reduction furnace substantially constant. The supply can be accomplished by the same methods as those usable for ore supply. As a typically used method, FIG. 5 shows the case where the coal is supplied from a hopper 104 located above the furnace.

During the operation of the in-bath smelting reduction furnace, ore and coal are continuously supplied from the hoppers 5 and 4, respectively, while oxygen is supplied by blowing from a top lance 2 in the direction of the bath. As a result, the supplied ore is melted and reduced to hot metal which settles to the lower part of the furnace.

The gas resulting from combustion of coal is recovered through an off-gas duct 10, the dust entrained by the gas is collected by a dust catcher 9, and the remaining dust-free gas is used as reduction gas for pre-reduction of ore in a pre-reduction furnace or as a fuel gas. The gas at this time contains a large amount of sensible heat which can advantageously be used for steam generation or the like. The duct for the off-gas is provided with an off-gas analyzer 20 for measuring the post combustion ratio and the like.

As the operation of the in-bath smelting reduction furnace proceeds, hot metal and slag accumulate within the furnace and are therefore periodically tapped. The operation can, therefore, be conducted continuously if required.

Since it is necessary for control purposes to monitor the state within the furnace, a sub-lance 19 is provided for taking samples of the hot metal and slag and for measuring the height of the upper surfaces of the slag and the hot metal.

In this invention, the weight of the remaining hot metal and slag is accurately ascertained at the time of periodical hot metal and slag discharge. This can be accomplished by providing a load cell or other such weight measuring device on the furnace body or by allowing the hot metal and slag remaining after hot metal and slag discharge to settle and then calculating the weight of each from their volumes, which can be obtained from the heights of the hot metal and slag surfaces measured at that time and the geometry of the furnace.

After this, the weight of the hot metal and slag are continually calculated from the aforesaid values and the increase in the weight of the hot metal and slag during operation as determined from the balance of the supplied materials.

It is possible to measure the height of the slag during operation by means of a probe, specifically by providing the sub-lance with electrical terminals between which electricity will pass when they come in contact with the slag surface. Alternatively, the height can be determined by reflecting microwaves off the slag surface, by an acoustic measurement method or in some other appropriate manner.

The carbon content is determined, for example, by inserting the sub-lance into the furnace every 5 minutes to measure the slag height, calculating the volume of the slag bath from the measured height and the furnace geometry, calculating the slag density, calculating the amount of CO gas generated by ore reduction from the ore supply rate, and deriving the carbon content from the relationship, determined beforehand, between these values and the carbon material content of the slag.

The carbon material content of the slag at that time determined in this way and the rate of change therein over time are then used to determine whether the slag carbon material content is within the appropriate range and also whether it will remain so in the future.

When it is determined that the carbon material content is insufficient, char is supplied from a char supply tank 6. The carbon material supplied at this time need not necessarily be char but may be coke, anthracite or any other carbon material with a low volatile matter content. On the other hand, when it is determined that the carbon material content is excessive, the rate of coal supply from the coal hopper 4 is reduced to lower the amount of carbon material in the slag.

Since the aim of the control is to adjust the amount of carbon material in the slag, in addition to changing the rate of coal supply, it is also effective to change, for example, the rate of oxygen supply so as to vary the rate of carbon material consumption.

In the present invention, when a large amount of carbon material is required within a short period of time, the deficiency is made up by supplying carbon material with a low volatile matter content. This is because the volatile matter content of the carbon material in the in-bath smelting reduction furnace does not burn easily and tends to reduce the post combustion ratio. Thus when carbon material containing volatile matter is supplied, the resulting decrease in the post combustion ratio changes the heat balance in the in-bath smelting reduction furnace, which leads to such problems as a pronounced drop in the hot metal temperature and a reduction in production rate because of the lack of sufficient heat for the reduction of the ore.

The inventors conducted experiments to determine what type of carbon material should preferably be supplied for adjusting the carbon content of the slag when it is insufficient.

The tested carbon materials were char, anthracite, semianthracite and fuel coal of the compositions shown in Table 1:

TABLE 1

| Type | FC | VM | Ash | TC | H | (%) O |
|---|---|---|---|---|---|---|
| Char | 83.2 | 0.9 | 13.3 | 83.9 | Tr. | 0.1 |
| Anthracite | 79.8 | 7.2 | 10.9 | 85.9 | 0.3 | 0.8 |
| Semianthracite | 75.1 | 12.9 | 11.0 | 85.8 | 0.6 | 1.6 |
| Fuel coal | 57.8 | 30.4 | 9.2 | 77.6 | 4.1 | 6.2 |

In the experiments, the above four types of carbon material were intermittently supplied to the furnace and the variation in the post combustion ratio was observed. The results are shown in FIGS. 4(a)–(d).

The in-bath smelting reduction operation at this time was being conducted using fuel coal with a volatile matter (VM) content of 30% under conditions of a production rate of 40 t/h and a coal supply rate of about 45 t/h. Except for the matter of whether or not additional carbon material was supplied, the conditions were the same in all cases.

The change in the post combustion ratio was found to stay within narrow limits when char or anthracite was added but to undergo a pronounced decrease during addition of semianthracite or fuel coal. Moreover, in the test operations in which semianthracite and fuel coal were added, a decrease in the hot metal temperature was observed during the addition and the production rate at this time also declined.

In this invention, therefore, for supplementing the carbon material content it is preferable to use a carbon material with a volatile matter content of not more than 10%.

Since it is possible to ascertain the carbon material content of the slag with good accuracy in the in-bath smelting reduction operation in accordance with the method of this invention, the state of slag swelling (the height of the slag surface) can be accurately controlled, thus enabling high productivity operation to be conducted stably and economically.

Operation according to one aspect of the invention will now be explained.

In in-bath smelting reduction, efficient agitation of the hot metal and molten slag and suspension of an appropriate amount of carbon material in the slag are important operational conditions governing the heat efficiency and reaction rate and, in turn, the production rate.

Using a test furnace of a size compatible with practical industrial operation, the inventors conducted various experiments in search of a method for reduction of the amount of generated iron dust and a method for preventing decrease in the post combustion ratio, both of which can be employed while satisfying the aforesaid operating conditions. As a result, they obtained the following knowledge.

First, for analyzing the iron dust generation mechanism, they investigated the distribution of iron droplets in the slag which constitute the most important factor in iron dust generation. This investigation was conducted by measuring the distribution of material in the slag.

In this test operation, an in-bath smelting reduction furnace with a maximum capacity of 120 tons was used and the measurements were made under the following operating conditions:

| Test furnace | |
|---|---|
| Max. capacity | 120 t |
| Bath surface | 22 m$^2$ |
| Inner volume | 131 m$^3$ |
| Experiment conditions | |
| Metal bath weight | 70–110 t |
| Slag weight | 21–45 t |
| Weight of carbon material in slag | 5–22 t |
| Ore supply rate | About 41 t/h |
| Coal supply rate | About 27 t/h |
| Oxygen top blowing rate | 20,000 Nm$^3$/h |
| Hot metal temp. | 1500° C. |
| Number of tuyeres | 1–6 |
| Agitation gas | N$_2$, CO$_2$ |
| Agitation gas flow rate | 400–4000 Nm$^3$/h |

For the aforesaid measurement there was used a special sub-lande with a 2000 mm long probe having 3 or 4 sample chambers built in at 300–500 mm intervals. The inlet of each sample chamber was closed with heavy paper which completely burned away a prescribed time after coming in contact with the molten material (molten slag, molten metal etc.), whereafter the molten material could flow into the chamber and thus be sampled.

The sub-lance with this probe was inserted into the slag during operation to take samples of the slag zone. After cooling, the samples were separated into slag and iron so as to determine the iron droplet content of the slag.

Figure 6:
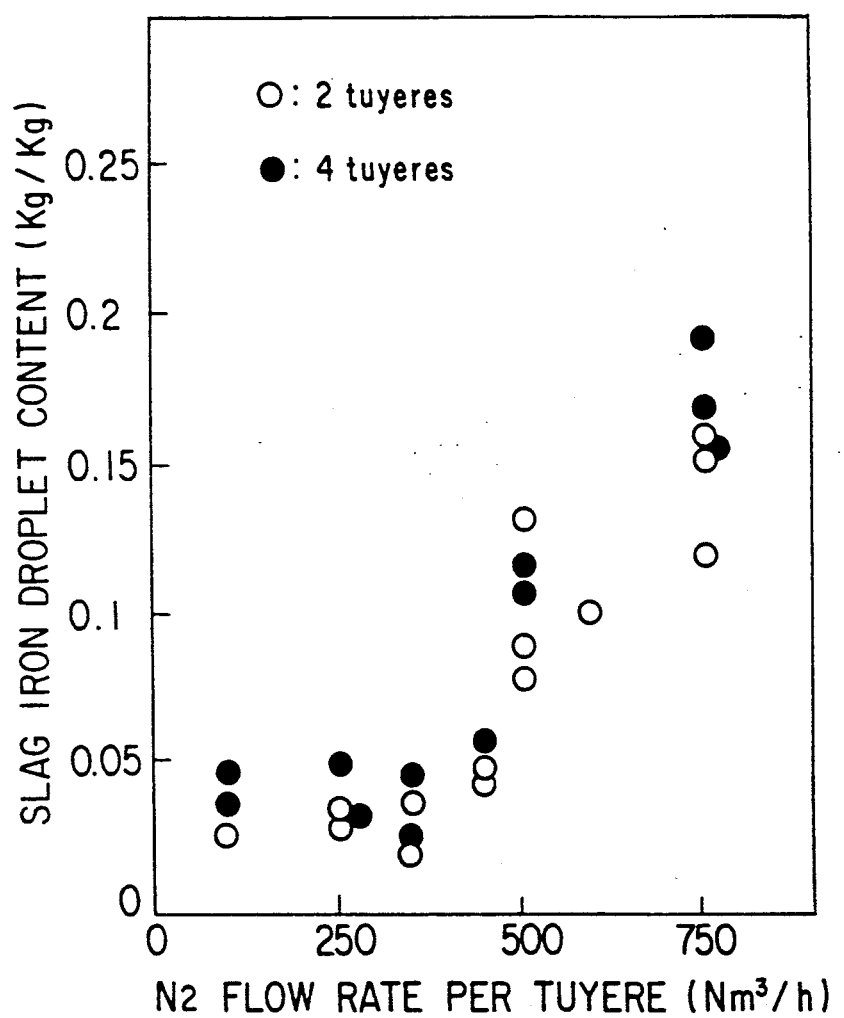
FIG. 6 is a graph showing the weight ratio between the iron droplets in the slag and the slag during operation of the in-bath smelting reduction furnace.

FIG. 6 shows examples of the results of the measurement for various N$_2$ flow rates and different numbers of tuyeres. The N$_2$ flow rate per tuyere is represented on the vertical axis and the iron droplet content on the horizontal axis. The sample concerned was taken 1.5 m above the metal bath surface. The blank and solid circles indicate the results in the case of operation using two and four tuyeres, respectively. The thickness of the slag zone at this time was 3–4 m.

Figure 7:
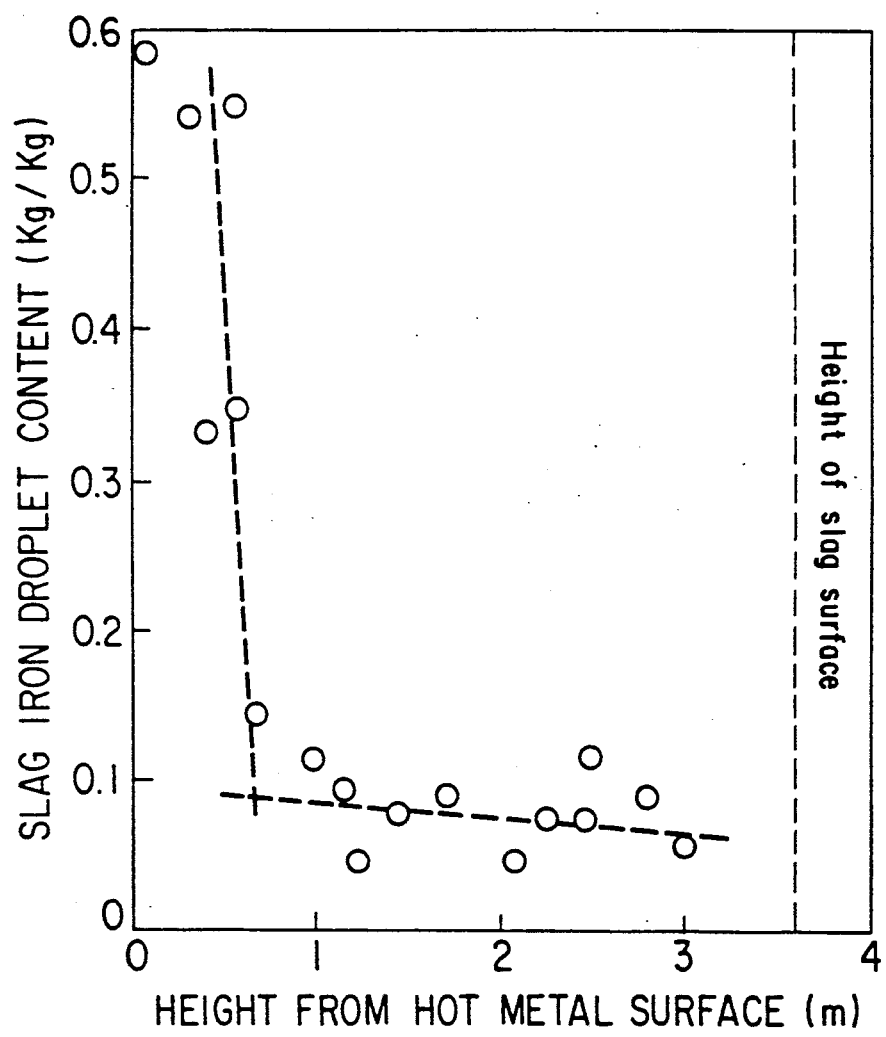
FIG. 7 is a graph showing the vertical distribution of the iron droplets in the slag.
Figure 8:
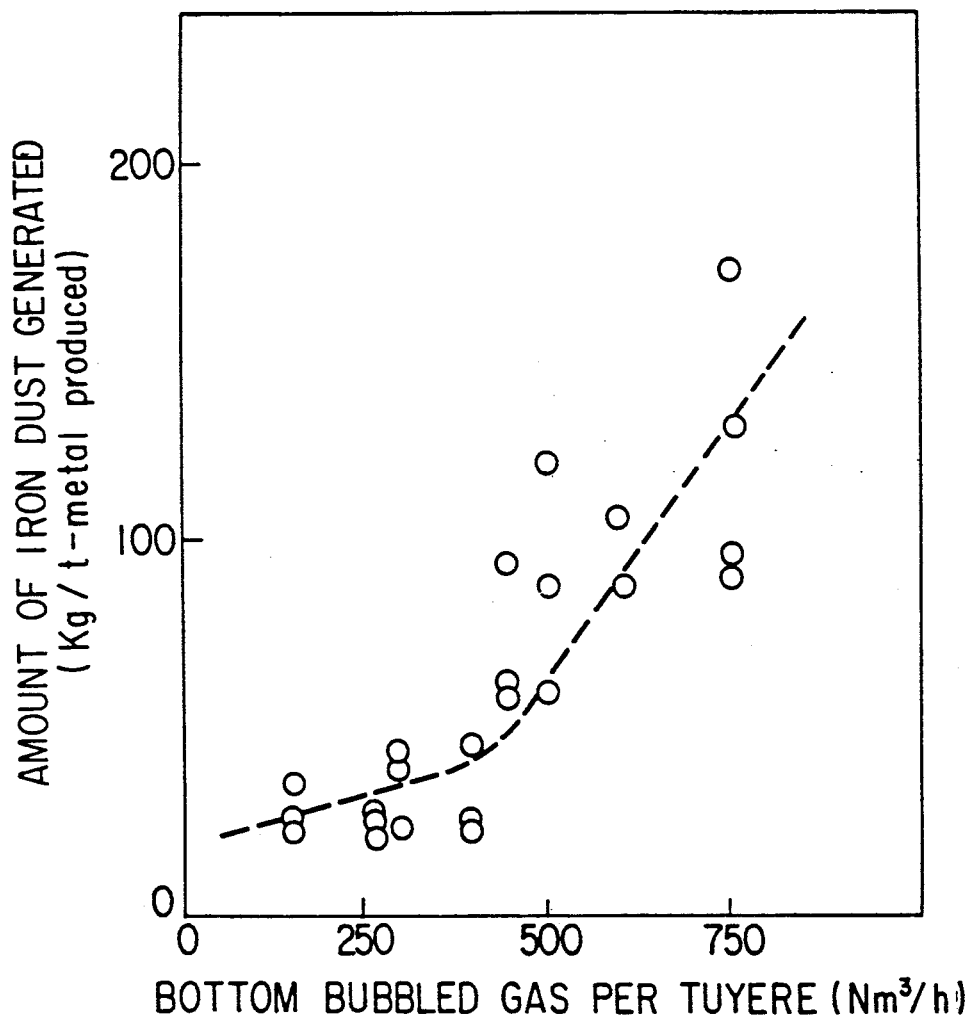
FIG. 8 is a graph showing the relationship between the gas flow rate per tuyere and the amount of iron dust generated.

The post combustion ratio, the transfer efficiency of the post combustion heat and the amount of iron dust in the off-gas duct at different N$_2$ flow rates and different numbers of tuyeres were also investigated. Examples of the results obtained are shown in FIGS. 7 and 8. FIG. 7 relates to the case of operation using 4 tuyeres and shows the vertical distribution of iron droplets in the slag at an agitation gas flow rate of 300 Nm$^3$/h/tuyere.

As can be seen from FIG. 7, the number of iron droplets in the slag increases sharply below a certain level. In other words it was discovered that sloshing of the metal bath surface and blowing-up of iron droplets caused a large amount of iron to be mixed in with the lower part of the slag zone.

FIG. 8 shows examples of the amount of iron dust that was found to be generated at different gas flow rates per tuyere.

As can be seen in FIG. 8, the amount of iron dust was low below a flow rate of 450 Nm$^3$/h/tuyere but became high above this level.

An analysis of the relationship between the amount of iron dust in the off-gas and the agitation gas flow rate conducted in the light of various factors in the foregoing manner showed that it is the gas flow rate per tuyere that has the greatest effect on the amount of iron dust. Further, from the results shown in FIG. 6 for the investigation into the relationship between the agitation gas flow rate per tuyere and the amount of iron droplets in the slag it was learned that the iron droplet content of the slag rises sharply when the agitation gas flow rate exceeds 450 Nm$^3$/h/tuyere.

Moreover, the amount of iron dust generation shown in FIG. 8 and the slag iron droplet content shown in FIG. 6 were observed to follow similar tendencies.

The inventors thus learned that reduction of the iron droplet content of the slag is one important condition for reducing the amount of iron dust. That is to say, it was learned that when the iron droplet content of the slag decreases, the amount of iron that is blown away by the oxygen jet and the generated gas decreases, causing the iron dust to decrease.

Specifically, it was ascertained that when the agitation gas flow rate per tuyere is made to fall in the appropriate range below 450 Nm$^3$/h/tuyere, the operation can be conducted at a low slag iron droplet content and the amount of iron dust generated can be reduced.

However, when the agitating gas used is CO$_2$, O$_2$ or other such gas which reacts with carbon in the metal bath, the reaction causes the gas volume to increase so that heavy iron dust generation occurs even at flow rates under 450 Nm$^3$/h/tuyere. This phenomenon can be offset, however, by multiplying the flow rate by a coefficient which takes into account the rate of volumetric change of the agitation gas due to reaction in the metal bath, thus allowing the use of such gases in the same way as inert gases such as N$_2$, Ar and the like. (Furnace pressure = 1 ata.)

$$Q = \alpha \times q \qquad (1)$$

where

Q: Equivalent gas flow rate (Nm$^3$/h) in standard operation state a: Rate of volumetric change in gas due to reaction in metal bath (−)

q: Actual agitation gas flow rate (Nm³/h)

a varies with the type of gas. For example, in the case of carbon dioxide, the gas volume doubles due to the reaction $CO_2+C \rightarrow 2CO$, so that $a$ is 2.

If the interior of the furnace should be pressurized for any of various reasons, the agitation gas will be compressed by the pressure in the furnace and have a smaller effective volume, whereby the amount of iron dust generated may in some cases remain low even at flow rates above the 450 Nm³/h/tuyere limit. In such cases, the equivalent gas flow rate under the standard operation state can be obtained by compensating the actual agitation gas flow rate according to the following equation $$Q = a \times q \times (p_0/p) \quad (2)$$

where $p_0$: Atmospheric pressure (ata.)
p: Furnace pressure (ata.)

However, since the atmospheric pressure is 1 atm., equation (2) can be rewritten as $$Q = a \times q/p \quad (3)$$

Thus since the metal bath agitation gas flow rate for realizing low iron dust generation can be evaluated from the equivalent gas flow rate Q obtained using equation 3, it is possible to express the condition in the furnace in a consistent manner.

For the above reasons, it is preferable to compensate the agitation gas flow rate using equation (3) and to use the resulting equivalent standard operation gas flow rate for controlling the operation.

Even when the flow rate of the bottom bubbled gas was 450 Nm³/h/tuyere or less, increased iron dust generation was observed when the metal bath agitation force came to exceed 6 kW/t owing to an increase in the number of tuyeres. This was found to be because the increased interference between the tuyeres that arose when the number of tuyeres was increased to secure greater agitation force caused a larger number of iron droplets to be blown up.

Figure 9:
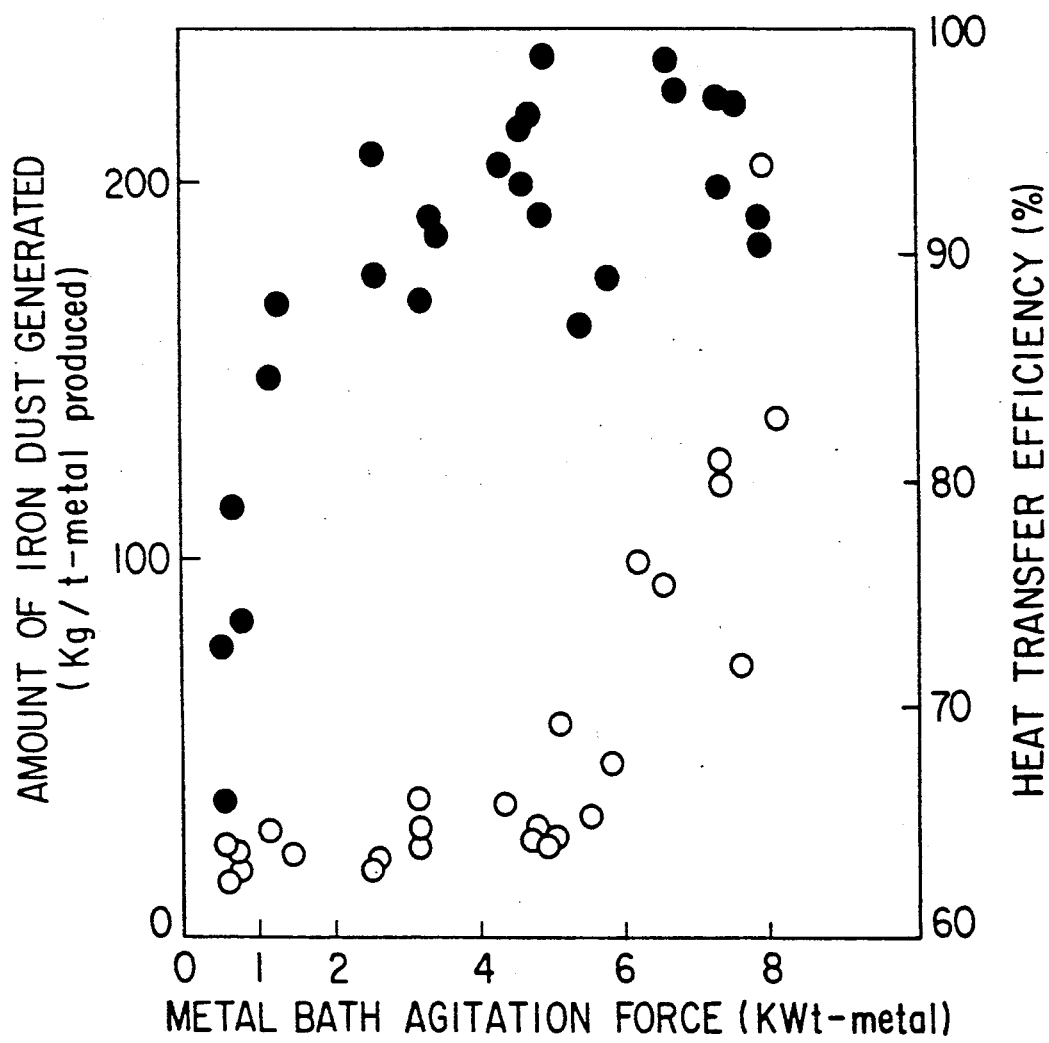
FIG. 9 is a graph showing the relationship between the metal bath agitation force and the amount of iron dust generated and the relationship between the metal bath agitation force and the heat transfer efficiency.

FIG. 9 shows the relationship between metal bath agitation force and the amount of iron dust generated and the relationship between metal bath agitation force and heat transfer efficiency that were observed under the condition of an agitation gas flow rate of not more than 500 Nm³/h/tuyere. In the figure, the vertical axis is graduated for the agitation force and the horizontal axis for the amount of iron dust generated and the heat transfer efficiency. The solid circles indicate the heat transfer efficiency values and the blank circles the amount of iron dust generated. The amount of iron dust generated rose sharply above an agitation force of 6 kW/t, indicating that iron dust generation increases when the agitation force is too strong.

Moreover, the heat transfer efficiency decreased below an agitation force of 1 kW/t, falling as low as 60–70% in some cases, and there was observed an increase in the temperature of the generated gas. As the agitation force there was used that obtained by the following equation $$\epsilon = \frac{0.103 a \cdot q \cdot t}{W} \left\{ \ln\left(1 + \frac{9.8 \rho \cdot d \cdot p_0}{101325 p}\right) + 0.05 \frac{t - t_0}{t} \right\} \quad (4)$$

where $\epsilon$: Agitation force (kW/t - metal)
W: Hot metal weight (t)
$\rho$: Hot metal density (kg/m³)
d: Hot metal bath depth (m)
$t_0$: Atmospheric temp. (K)
t: Metal bath temp. (K)

As can be seen in FIG. 9, generation of iron dust increases with increasing agitation force and increases very sharply over an agitation force of 6 kW/t. For this reason the upper limit of the metal bath agitation force in this invention is set at 6 kW/t.

Next, a study was conducted to determine the relationship between the iron droplet distribution in the slag investigated earlier and the oxygen jet from the top As can be seen from FIG. 7 showing the vertical distribution of iron droplets in the slag which was determined using the aforesaid sub-lance probe, a large number of iron droplets are present in the lower portion of the slag as a result of being blown up by the agitation gas. The thickness of the zone containing a large number of iron droplets (sometimes referred to as the iron condensed zone in this specification) is most strongly affected by the gas flow rate per tuyere. The relationship between the gas flow rate and the thickness of the zone containing a large number of iron droplets is expressed in FIG. 10 in terms of the thickness T of the zone at the bottom of the slag having a high iron droplet content (iron condensed zone) one has determined from the results shown in FIG. 7.

Figure 10:
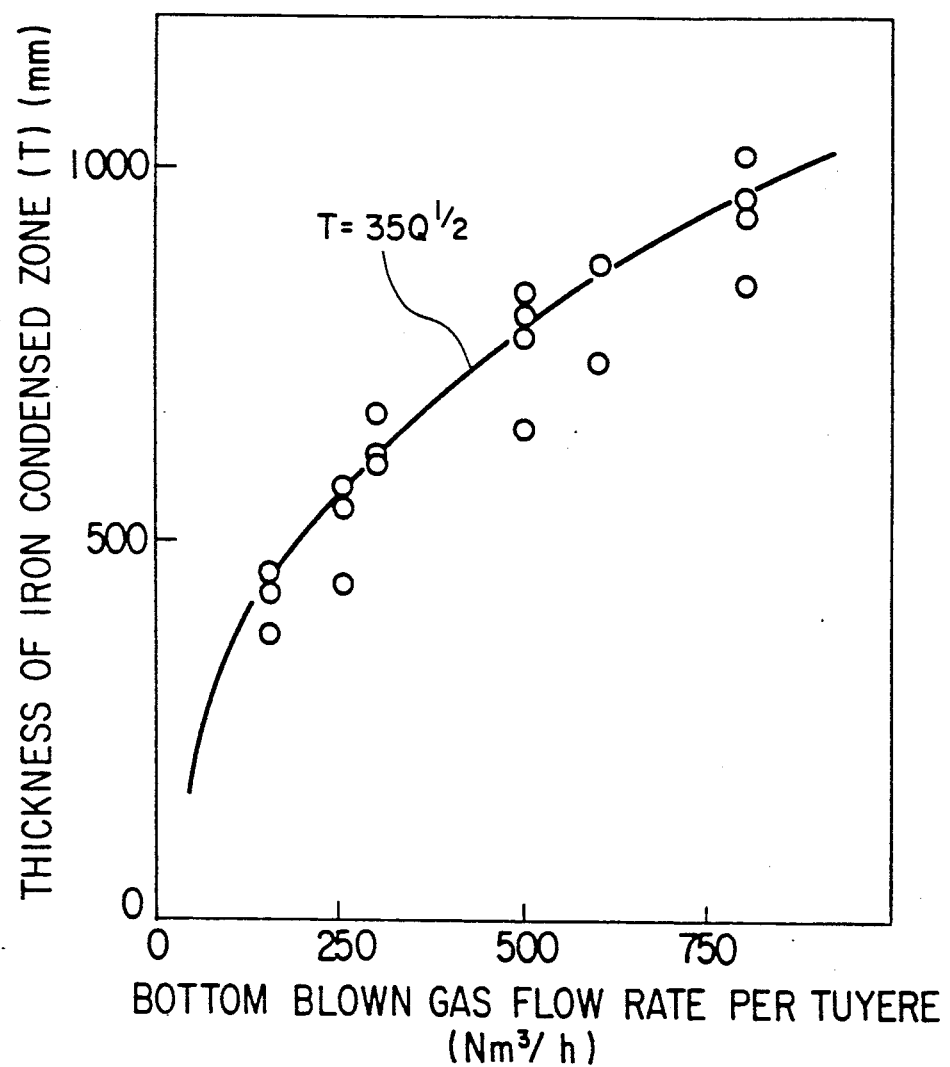
FIG. 10 is a graph showing the relationship between the bottom-blown gas flow rate per tuyere and the thickness of the slag iron condensed zone below the slag zone.

The graph of FIG. 10 is based on the study results shown in FIG. 7 and shows the relationship between the agitation gas flow rate and the thickness of the iron condensed zone at the bottom of the slag. Here again the strong effect of the agitation gas flow rate per tuyere can be noted.

The following equation was derived from the relationship shown in FIG. 10:

$$\text{Thickness: } T = 35 Q^{\frac{1}{2}} (\text{or } 35(a \times q/p)^{\frac{1}{2}}) \quad (5)$$

where

Q: Bubbled gas flow rate per tuyere defined by Eq. (3)

For determining the effect of the interaction between the oxygen jet and the iron condensed zone, an experiment was conducted to determine the effect of raising and lowering the top lance on the depth L of the slag cavity caused by the top-blown oxygen jet. The value of L was calculated according to a report by Segawa et al. ("Tetsu-Yakin-Hannou-Kougaku", *Nikkan-Kogyo Shimbun Sha*, 1969) as compensated for the physical properties of the slag, by the following equations:

$$h_0 = 36.0(k \cdot F/D)^{\frac{1}{2}}$$

$$L = h_0 \exp(-0.78 \, h/h_0) \cdot (\rho_M/\rho_S) \quad (6)$$

where k: Nozzle coefficient (−) (See FIG. 13)
F: Top-blown oxygen flow rate (Nm³/h)
D: Lance diameter (mm)
h: Lance nozzle diameter (mm)

$\rho_M$: Hot metal density (t/m³)
$\rho_S$: Slag density (t/m³)

Figure 13:
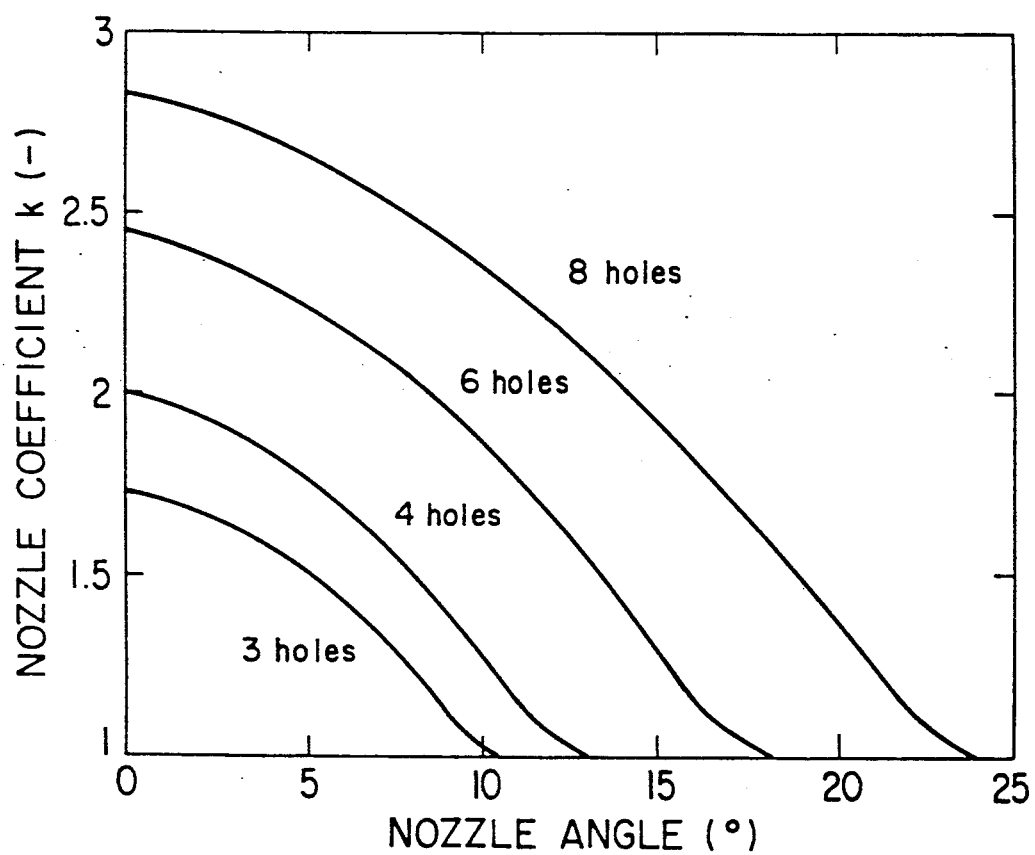
FIG. 13 is a graph showing the relationship among the nozzle coefficient k used for calculating the depth L of a slag cavity produced by the oxygen jet, the nozzle angle and the number of nozzle holes.

The nozzle coefficient was obtained from the relationship between the nozzle angle of the top lance and the number of nozzle holes reported by Segawa et al. and shown in FIG. 13.

It was observed that when the slag cavity depth L reaches to within the thickness T of the iron condensed zone 113 (FIG. 5), the amount of iron dust loss increases even if the agitation gas flow rate is no more than 450 Nm³. The relationship between the slag cavity depth L caused by the oxygen jet and the iron condensed zone 113 is illustrated schematically in FIG. 5 for easy understanding. FIG. 5 is a detailed view of the interior of the in-bath smelting reduction furnace, in which a molten metal iron bath 111 is seen at the lowermost part of the furnace. Above the metal bath 111 is a topmost molten slag zone 112, which is foamed by agitation gas passing upward therethrough. Below the slag zone 112 is the iron condensed zone 113 formed by iron droplets blown up by the bottom bubbled gas. The thickness of the iron condensed zone 113 is represented by T and the combined thickness of the slag zone 112 and the iron condensed zone 113 is represented by $L_0$. The upper part of the slag contains some iron droplets and a relatively large amount of carbon material and the molten slag is agitated so as to circulate by the bottom bubbled gas and the carbon monoxide gas generated during ore reduction. Top-blown oxygen is directed toward the slag zone 112 from a lance 102 to form a supersonic or subsonic jet which displaces the slag to from a cavity with a depth L.

Under these operation conditions it was observed that as a result of the contact between the top-blown oxygen and a large number of iron droplets, the carbon dioxide and steam generated by the oxygen-induced combustion reacted with the carbon in the hot metal to form carbon monoxide and hydrogen. Thus the post combustion ratio declined, causing a decrease in heat supply and a lowering of the production rate.

Figure 11:
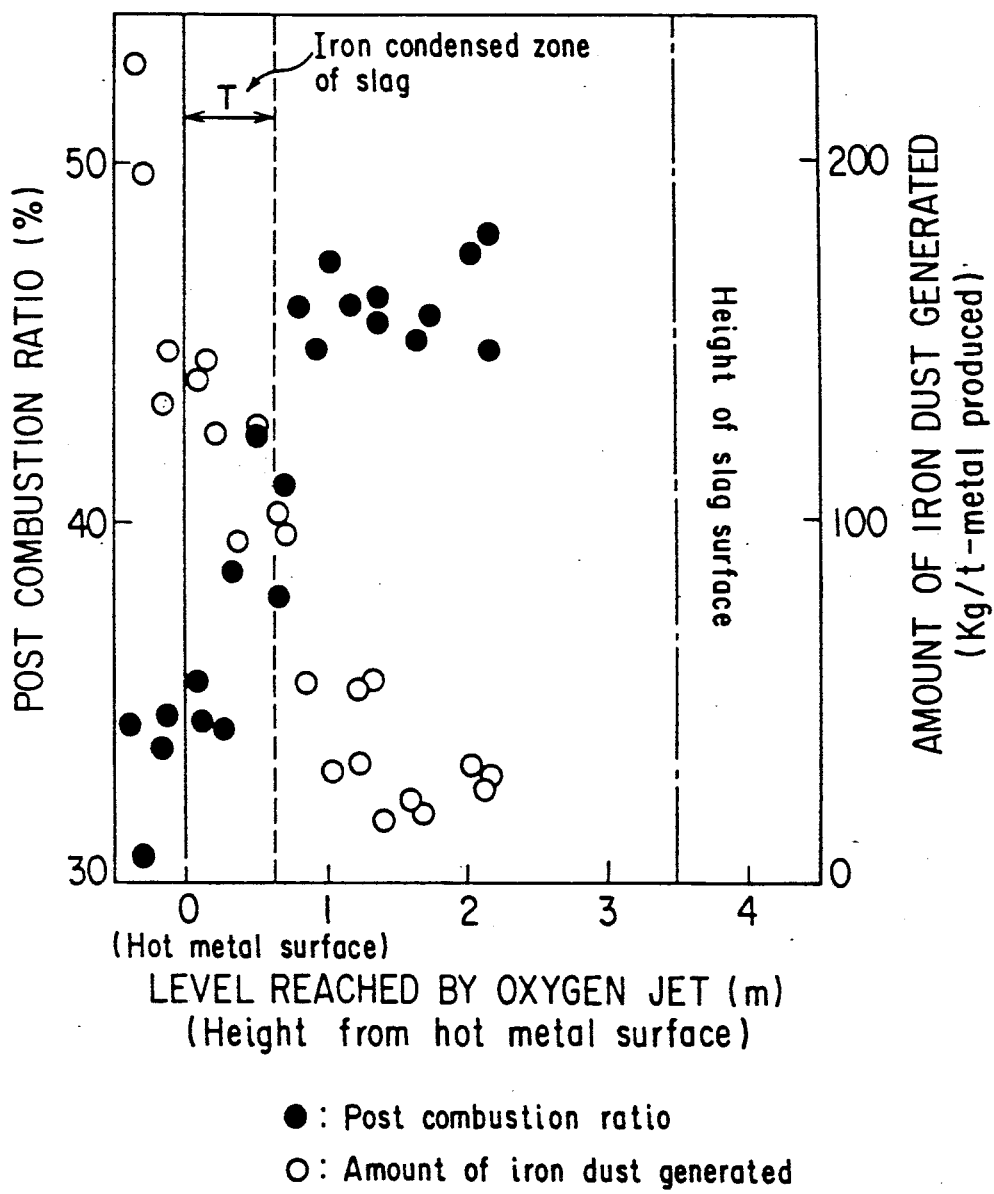
FIG. 11 is a graph showing the relationship between the level reached by the oxygen jet and the amount of iron dust generated and the relationship between the same and the post combustion ratio.

Therefore, for further reducing the amount of iron dust and maintaining a high post combustion ratio, it is preferable not only to control the agitation gas flow rate but also to ensure that the depth L of the slag cavity produced by the oxygen does not come to within the thickness T of the iron condensed zone 113. The positional relationship between ($L_0-L$) and T and the relationship between the amount of iron dust generated and the post combustion ratio are shown in FIG. 11. It was found that in operation where the oxygen jet advances into the iron condensed zone (where $L_0-L<T$), the iron dust generation is high and the post combustion ratio is low. The slag thickness during the operation was 2800 mm and the thickness of the iron condensed zone below the slag was 600 mm.

When expressed in terms of the depth L of the slag cavity produced by the top-blown oxygen, the slag thickness $L_0$ and the bottom bubbled gas flow rate, this relationship can be expressed according to Eq. (5) as $$L_0-L<35\,(a\times q/p)^{\frac{1}{2}} \qquad (7)$$

In other words, operation under top oxygen blowing and agitation gas supply conditions satisfying the relationship $L_0-L<35\,(a\times q/p)^{\frac{1}{2}}$ is important for realizing low iron dust generation and maintenance of a high level post combustion ratio. The inventors discovered that operation under these conditions ensures good unit consumption of coal and good metal yield.

Next, through a study of the relationship between the metal bath agitation force and the transfer efficiency of the post combustion heat it was learned that transfer efficiency of the post combustion heat decreases when the agitation force is low.

relationship between the metal bath agitation force defined earlier by Eq. (4) and the heat transfer efficiency was studied. The results are shown in FIG. 9. It was found that when the metal bath agitation force is less than 1 kW/t, the transfer efficiency of the post combustion heat becomes poor. At less than 1 kW/t, the gas temperature in the furnace rose, causing damage to the refractory, and the unit consumption of coal became poor.

It is thus preferable to use a metal bath agitation force that is not less than 1 kW/t and, in view of the aforesaid study regarding iron dust generation, not greater than 6 kW/t.

The lower limit of the agitation force was studied further. In in-bath smelting reduction, when the ore metal temperature is 1500° C. and the depth of the metal bath is 700–1000 mm, the bottom bubbled gas flow rate should be more than 70 Nm³/h per 1 mz of furnace bottom area (inert gas; equivalent to value at 1 ata.) to prevent metal leak into the tuyere pipes. On the other hand, since large, specially shaped fire bricks are used for constructing the tuyeres for the agitation gas and the surrounding support structure, it is not possible to provide the tuyeres at very close intervals. In addition to this problem, it is also known that back attack of the gas and the like causes wear at the tuyeres to proceed more quickly that at the surrounding refractory so that only the tuyeres tend to wear in a crater-like pattern. When the tuyeres are too close together, the heavily worn regions tend to interconnect so that the refractory at the furnace bottom wears heavily as a whole. It is therefore ordinarily preferable to space the tuyeres from each other by about 1 m. As this means that there is one tuyere per approximately one square meter, the minimum flow rate per tuyere becomes 70 Nm³/h. From Eq. (4), the agitation force at this time is 1 kW/t.

As is clear from the foregoing, the inventors clarified those conditions for agitation of the metal bath and the slag by the agitation gas which enable the operation to be carried out more favorably than under conventional conditions.

In in-bath smelting reduction operation it is, as was pointed out earlier, also very important from the operational aspect to control the loss of carbon material by entrainment by the off-gas. The inventors therefore also made a concentrated study on methods for reducing carbon material loss by entrainment.

Figure 12:
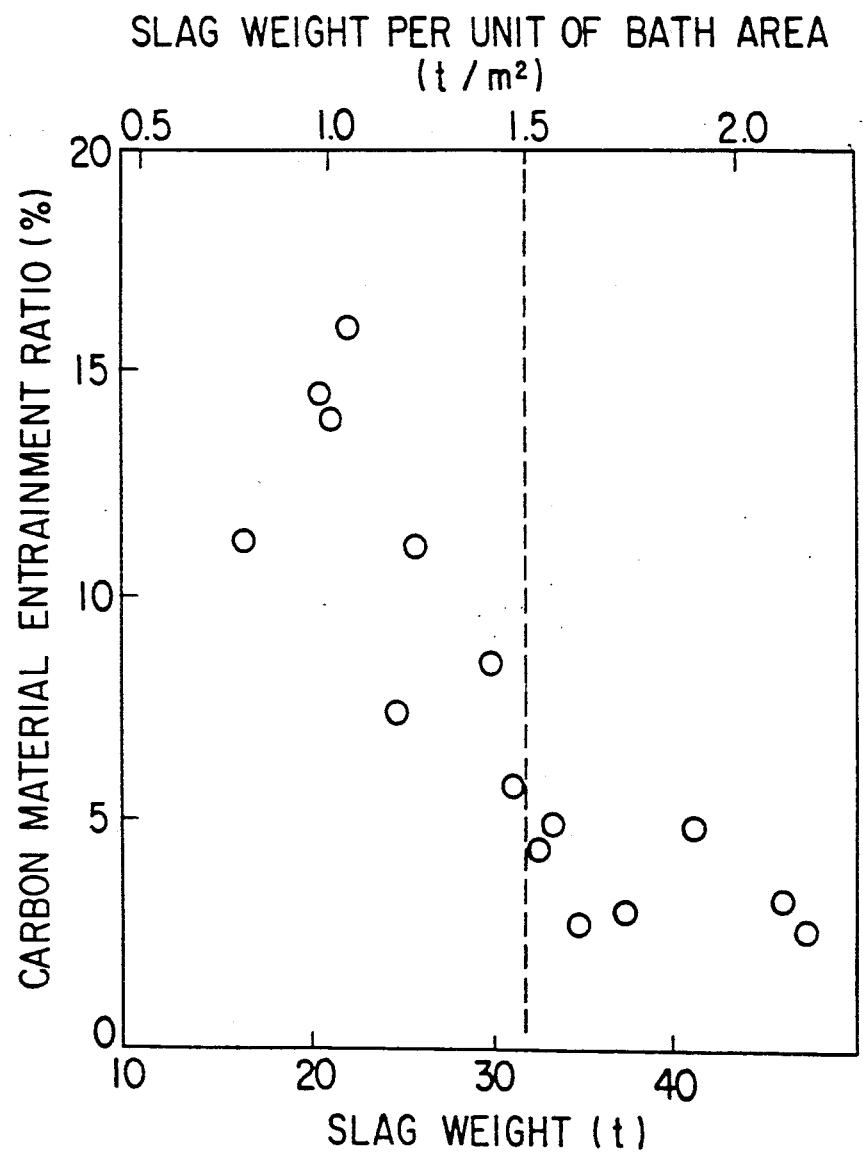
FIG. 12 is a graph showing the relationship between the slag weight and the amount of carbon material dust generated.

FIG. 12 shows an example of the results of a study into the relationship between slag weight and amount of generated carbon material dust conducted under various conditions. It will be noted from this figure that the generation of carbon material dust decreases with increasing slag weight or increasing slag weight per unit area of the metal bath and that a slag weight of not less than 1500 kg/m², particularly not less that 2000 kg/m², is preferred. In other words, the operational factor having the strongest effect on the carbon material entrainment loss is the weight of the slag in the furnace.

To learn the cause for this, the inventors measured the molten slag swelling state during in-bath smelting reduction operation and learned that the passage of generated gas through the slag causes the volume of the slag to swell to 3–4 times that in a calm state.

More specifically, when the apparent specific gravity was calculated from the degree of swelling, it was found that the specific gravity of the swollen slag was 0.5 –0.7 t/m$^3$. This specific gravity value is approximately the same as the apparent specific gravity of 0.7–0.8 t/m$^3$ of the carbon materials (in the form of char) suspended in the slag.

Carbon material with an apparent specific gravity the same as that of the slag is capable of blending in well with the vigorously circulating slag. It was thus found that by increasing the slag weight, the carbon material covering effect of the slag could be enhanced, thus reducing the percentage of the carbon material transferring into the gas.

From the fact that increasing the amount of slag in the furnace to increase the thickness of the slag zone enables the slag to cover the carbon materials sufficiently and that this slag covering effect is determined by the slag zone thickness, it was thus learned that the slag weight should be evaluated in terms of weight per unit area of the metal bath.

FIG. 12 shows how the carbon material loss decreases with increasing slag weight. In the equipment used, the carbon material entrainment loss could be held to not more than 10% if the slag weight was made to be not less than 30 or 33 tons, which amounts to a slag weight per unit area of the bath of not less than 1500 kg/m$^2$.

In this test operation, the amount of iron dust and carbon material dust entrained by the gas generated during in-bath smelting reduction operation could be reduced. Moreover, the operation could be conducted at a high post combustion ratio and a high heat transfer efficiency, whereby a good metal yield was obtained at a low unit consumption of coal and oxygen, making it possible to produce hot metal at a low production cost and improved productivity.

Operation according to another aspect of the invention will now be explained.

Figure 14:
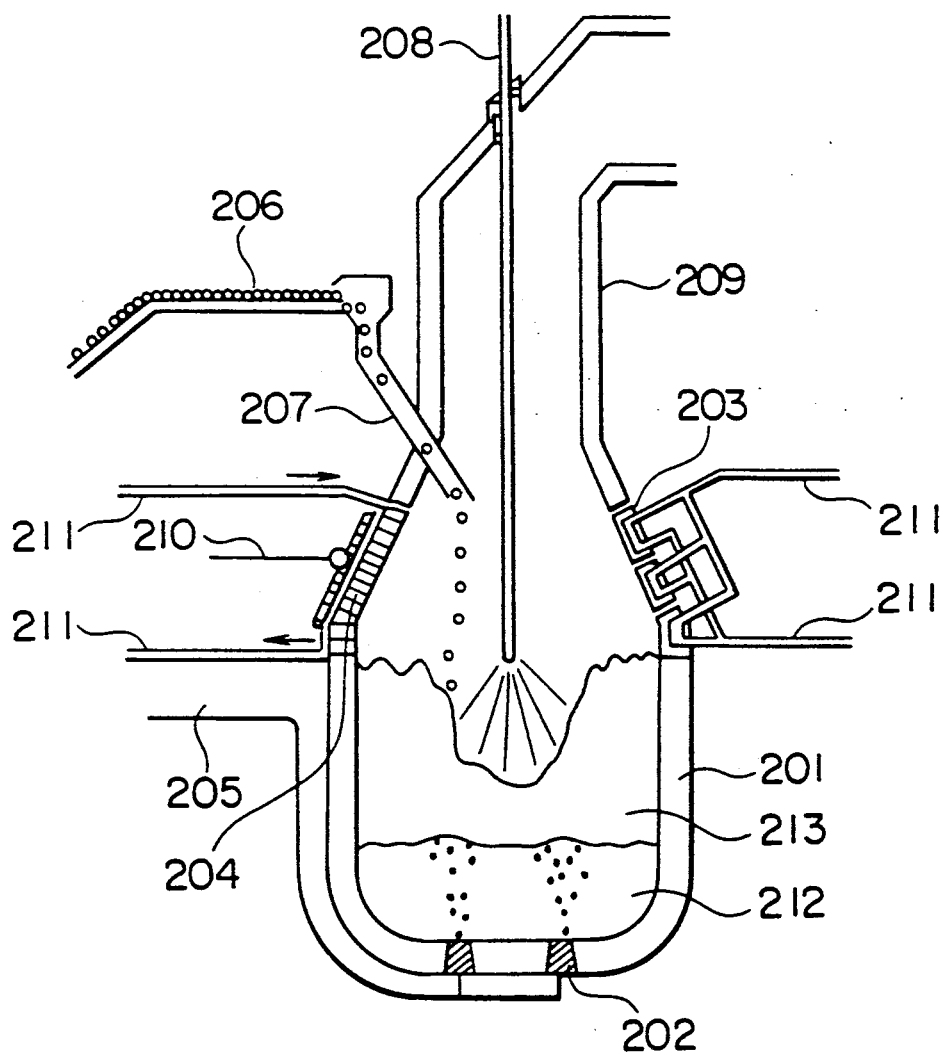
FIG. 14 is a sectional view of a system for explaining operation according to another aspect of the method of the present invention.

FIG. 14 a sectional view of the system used in the operation according to this aspect of the invention.

In this figure reference numeral 201 designates the furnace body refractory, which is made of materials with heat resistant refractory properties such as MgO, Al$_2$O$_3$, Cr$_2$O$_3$, carbon or the like, and 202 indicates bottom bubbling tuyeres through which gas is injected for agitating the metal and slag baths. Since the main purpose of the gas injection is agitation, there is no particular limitation on the kind of gas used. Ordinarily, nitrogen, argon, carbon dioxide or oxygen is employed. Reference numeral 205 designates piping for the bottom bubbling gas.

Reference numeral 204 designates a refractory cooling section at which the outer surface of the refractory is cooled through the furnace shell by cooling water and the interior of the refractory is cooled by passing cooling gas through pipes embedded within the refractory. As the gas is used solely for cooling it is not limited to any particular type. Normally, nitrogen gas, carbon dioxide gas, off-gas from the in-bath smelting reduction furnace or the like is used. A mist consisting of a cooling gas mixed with water can also be used.

For ensuring efficient cooling in this region it is preferable to use a refractory with a high heat conductivity such as Al$_2$O$_3$—C or MgO—C.

Reference numeral 203 denotes a metallic cooling plate provided with a refractory coating on its inner surface. Enough cooling water is passed to prevent the metallic surface of the cooling plate 203 from melting. The cooling plate 203 is ordinarily formed of copper, pig iron or steel, but titanium plates are sometimes used at the regions where the heat load is particularly large.

The refractory cooling section 204 and the cooling plate 203 are mainly provided at a region of the furnace body above that in contact with the slag. While in some cases only one or the other of the refractory cooling section 204 and cooling plate 203 is installed, FIG. 14 illustrates an arrangement in which they are used in combination. Moreover, depending on the situation, the cooling plate 203 can be installed in the region below the upper surface of the slag.

Reference numeral 206 indicates a belt conveyor and chute for charging of materials. While FIG. 14 shows an arrangement in which the materials are supplied from above, it is alternately possible to blow powder materials onto the slag or into the metal or slag bath.

Reference numeral 208 indicates a top oxygen lance. One having 4–20 nozzles is normally used so as to promote post combustion.

Reference numeral 209 is an off-gas duct, which is ordinarily either water cooled or lined with refractory. In the case where it is water cooled, it is possible to recover sensible heat of the off-gas as steam or the like.

Reference numeral 212 designates the metal bath. The iron in this bath contains a large amount of carbon, normally between 2% and the carbon saturated state. Reference numeral 213 indicates the slag bath. The metal bath agitation gas and the carbon monoxide gas generated during the reduction of iron oxides rises through the slag bath and cause it to foam and swell to a volume that is 3 –4 times that in the unswelled state.

An explanation will first be given on the low-temperature operation that is one feature of this aspect of the invention.

Operation with the metal bath maintained at a low temperature provides the following effects:

① Since the temperature of the hot metal and the slag is low, the wear rate of the refractory in contact with these zones is decreased.

② Since the sensible heat of the hot metal, the slag and the off-gas are lower, the heat generated in the furnace can be effectively used for reduction and the amount of heat carried out of the system as off-gas sensible heat is reduced, whereby the heat balance is improved. As a result, the unit consumption of coal and oxygen are reduced and productivity improved.

③ As the off-gas temperature is lower, there is less heat load on the off-gas recovery equipment, which means that less cooling water is required and that the service life of the cooling water piping and the off-gas recovery equipment is extended.

④ The lower temperature of the hot metal and slag thermodynamically increases the percentage of the P and Mn entering the slag phase so that it becomes easier to remove impurities from the hot metal. As a result, production of high-purity steel is facilitated and the costs for refining to remove P and Mn are reduced.

⑤ Where the slag generated by the in-bath smelting reduction is to be recycled for use as a material, it can, similarly to blast furnace slag, be used as a material for cement or a road bed material. In these cases, if the MgO content is high, MgO will precipitate during hardening and the precipitated MgO will absorb moisture from the atmosphere and cause swelling. The maximum MgO content of the slag allowing its use for such purposes is thus considered to be 13%. Therefore, in order to suppress elution of MgO from the refractory in the case where MgO type refractory is used for the furnace lining, it has been the general practice to add MgO to the slag during operation. In the case of low-temperature operation, since the MgO saturation content at lower temperature is less, the MgO content of the slag can be easily held to not more than 13% even when its MgO content is at saturation.

Figure 15:
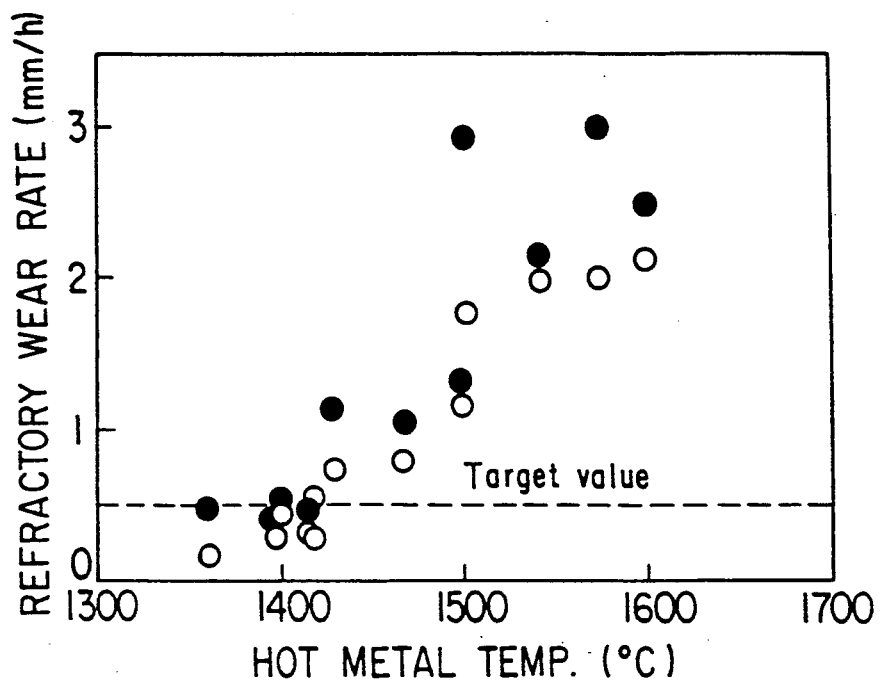
FIG. 15 is a graph showing the relationship between the hot metal temperature and the refractory wear rate at the bottom of the furnace.

The reduced state of the refractory wear rate is illustrated in FIG. 15.

The data represented in FIG. 15 are those for a test operation conducted at bath temperatures in the range of 1350°–1600° C. in a 100 ton furnace. The equipment used was similar to that shown in FIG. 14. All of the materials were supplied from the top and all of the oxygen was top blown from a lance. Agitation by bottom bubbling was conducted by the blowing of nitrogen gas. The agitation force was calculated using Eq. 4 and was found to be within the range of 1–6 kW/t per unit metal bath weight.

The operation conditions were: post combustion ratio of 40–45% and slag composition of 1.2–1.35 $CaO/SiO_2$, 14–17% $Al_2O_3$ and $MgO<13\%$. The refractory was of MgO—C type and the slag weight was 1200 $kg/m^2$.

The blank circles in the figure indicate the refractory wear rate in the metal bath zone (furnace bottom) while the solid circles indicate the refractory wear rate in the slag bath zone (furnace wall).

It will be noted that the refractory wear rate decreases with decreasing hot metal temperature in both the metal bath zone and the slag bath zone, and that at 1420 °C and below the target value of 0.5 mm/h is achieved.

However, the smaller kinetic coefficient resulting from the lower operating temperature makes it impossible to attain a high reduction reaction rate. The results of a study made on this problem are shown in FIG. 16.

Figure 16:
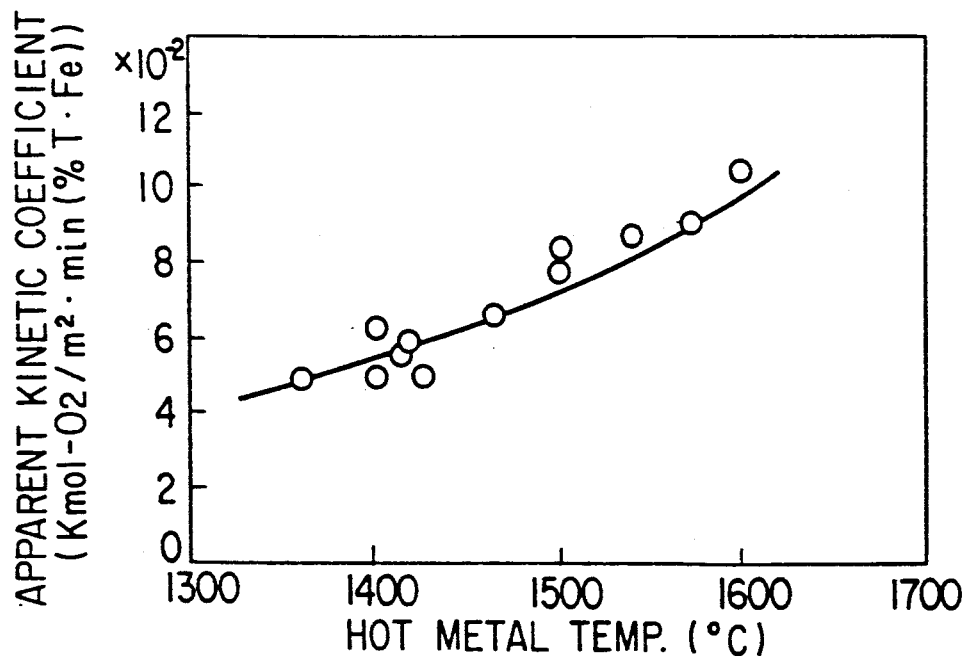
FIG. 16 is a graph showing the relationship between the hot metal temperature and the apparent kinetic coefficient.

Specifically, FIG. 16 shows the results obtained in an investigation of the apparent kinetic coefficient at different hot metal temperatures in operation under conditions identical to those of FIG. 15 and a slag weight of 1200 $kg/m^2$. The iron reduction reaction is represented by the following general equation and the reduction rate under standardized operating conditions is represented as $$R = k(\%T. Fe)$$

where

R is the reduction rate (kmol $-O_2$·min)

(%T·Fe) is the total metal weight % of the slag (%)

k is the apparent kinetic coefficient (kmol $-O_2/m^2$·min (%T·Fe))

For comparison, the apparent kinetic coefficient k per (T. Fe) 1% of the slag per unit area was calculated and plotted against the hot metal temperature. As is clear from FIG. 16, the kinetic coefficient k decreases with decreasing hot metal temperature.

In order to find a method for overcoming this problem, the inventors conducted test operation under various conditions and, as a result, learned that a high kinetic coefficient can be obtained by increasing the amount of slag.

Specifically, an experiment was conducted in which the amount of slag was increased during operation in which the hot metal temperature was maintained in the range of 1360°–1420° C.

Figure 17:
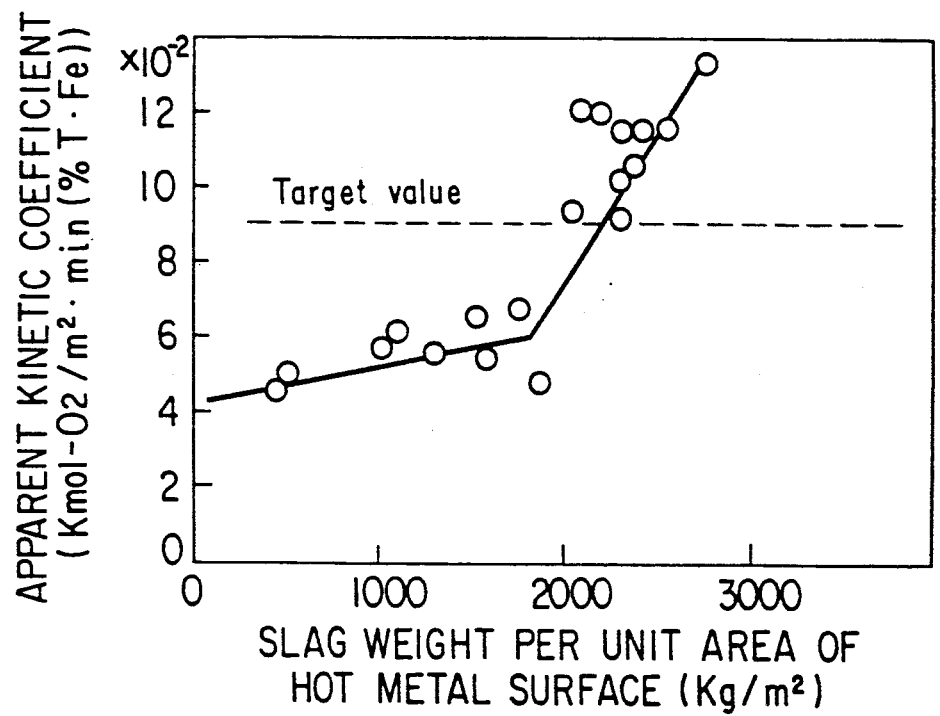
FIG. 17 is a graph showing the relationship between the amount of slag and the apparent kinetic coefficient.
Figure 4A:
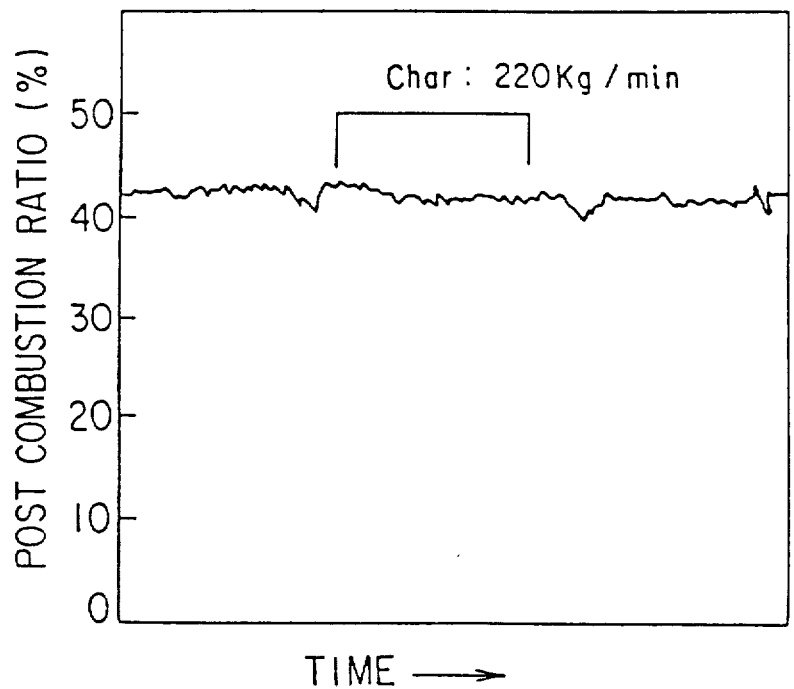
Figure 4B:
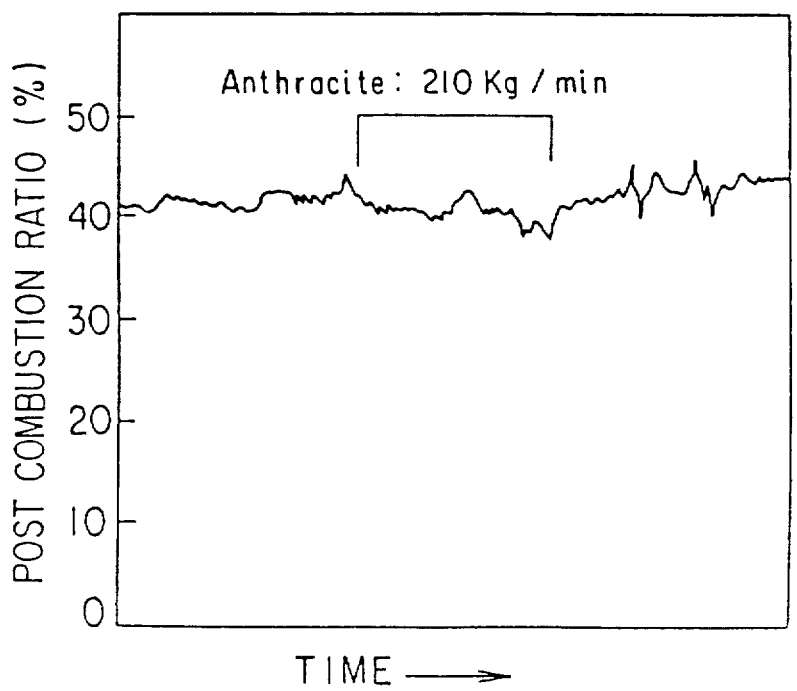
Figure 4C:
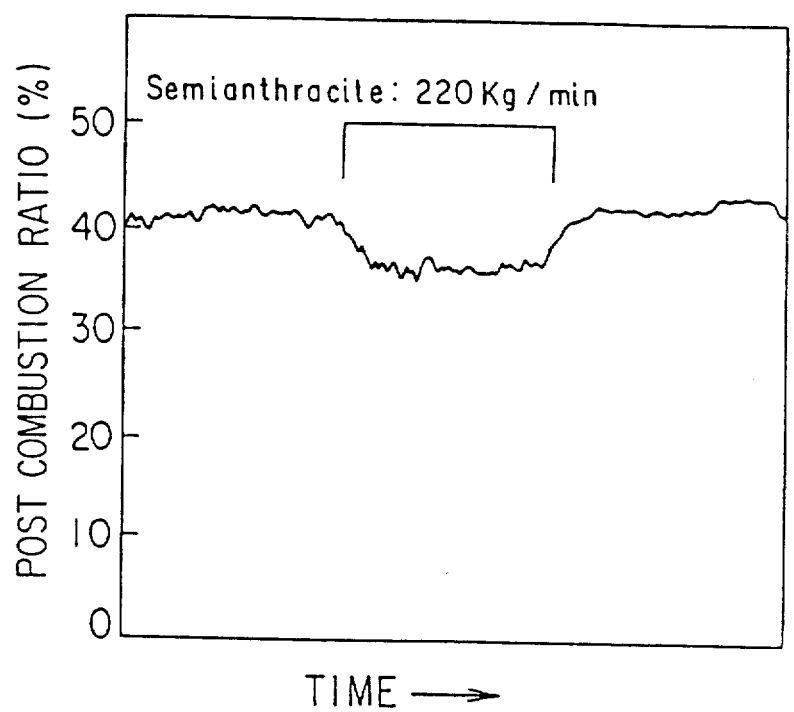
Figure 4D:
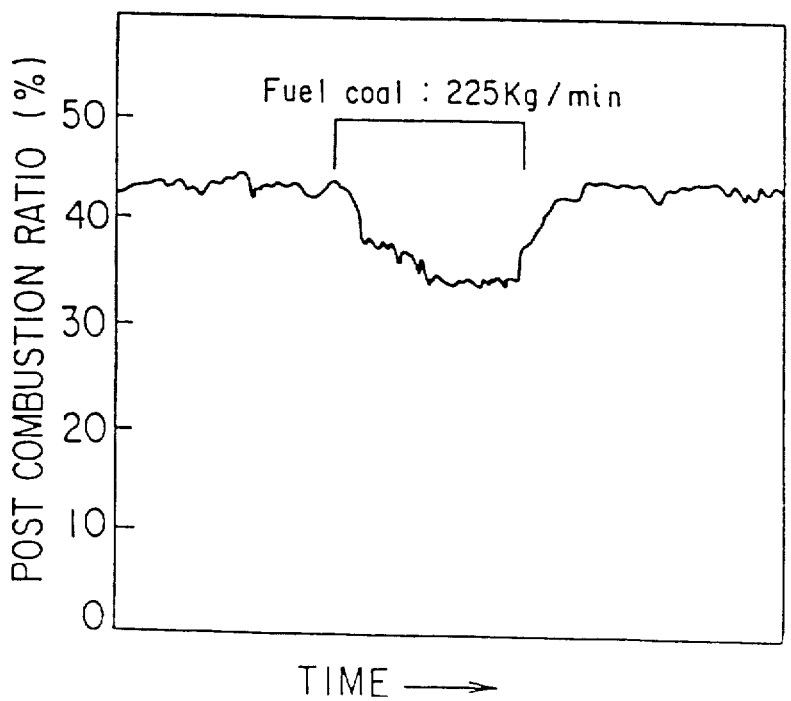

FIG. 17 is a graph showing the relationship between the apparent kinetic coefficient and the amount of slag.

It will be noted that the apparent reduction rate increases with increasing slag amount and that the rate of increase becomes particularly sharp after the amount of slag exceeds 2000 $kg/m^2$.

The production rate per unit furnace floor area in the blast furnace process is approximately 100 $t/m^2$·day. For achieving a production rate on a par with this in commercial scale in-bath smelting reduction operation, it is necessary to achieve an apparent reduction rate of 0.09 kmol $-O_2/m^2$·min (T. Fe) or higher.

As shown in FIG. 17, it was found that a value of 0.09 or higher can be obtained by increasing the slag amount to not less than 2000 $kg/m^2$. The reason for the sharp increase in the apparent reduction rate when the ta-mount of slag is increased from 1500 $kg/m^2$ to 2000 $kg/m^2$ is that the increase in the thickness of the slag zone ensures that the depth of the cavity in the slag zone produced by the top blown oxygen is less than the thickness of the slag so that oxidization of the metal bath by the blown-in oxygen is prevented.

The composition of the slag will now be discussed.

As was stated above, by increasing the amount of slag it is possible to achieve high productivity even at a hot metal temperature of 1,420 °C. or lower. This is possible, however, only if the slag has a composition giving it good flowability.

As was explained earlier, it is necessary to keep the MgO content of the slag at not more than 10% if the slag is to be usable as a cement or road bed material. Since the saturation temperature of dissolved MgO in the slag decreases with decreasing slag temperature, lowering the slag temperature is an effective way of adjusting the slag MgO content.

The composition of the slag which enables the slag to maintain flowability even at temperatures not exceeding 1420 °C. when the MgO content is 13% or less is what is known as the Melilite phase, specifically a composition satisfying the conditions of $CaO/SiO_2 = 0.8–1.4$ and $Al_2O_3 = 15–25\%$. Moreover, since the melting point of the slag rises when its $Al_2O_3$ content is less than 15%, it is preferable for operation at 1420 °C. or less to satisfy the condition of $Al_2O_3 = 15–25\%$.

In in-bath smelting reduction, the reduction rate is strongly affected by the $CaO/SiO_2$ of the slag and, moreover, when the $CaO/SiO_2$ is low, it becomes difficult to remove such impurities as P, Mn and the like. It is therefore preferable to maintain $CaO/SiO_2$ at not less than 1.1.

It is thus necessary to control the amount of fluxes supplied with respect to the gangue in the ore and the ash in the carbonaceous substances so as to maintain the slag composition within the range of $CaO/SiO_2 = 1.1–1.4$, $MgO<13\%$ and $Al_2O_3 = 15-25\%$ (wt. % in slag). The fluxes supplied include limestone, dolomite, silica, alumina and the like.

The refractory will now be discussed.

Refractories currently used in the steelmaking industry include those of MgO type, $Al_2O_3$ type, CaO type, $SiO_2$ type $Cr_2O_3$ type and $ZrO_2$ type. As the CaO and $SiO_2$ type refractories exhibit excessively high wear rates under the aforesaid slag composition conditions, they are not appropriate from the point of durability. Use of the $Cr_2O_3$ type should preferably be avoided since the Cr therein tends to dissolve into and increase the Cr content of the hot metal as a result of refractory wear. The $ZrO_2$ type tends to increase the viscosity and degrade the flowability of the slag when it becomes incorporated therein.

It is therefore preferable to use MgO or $Al_2O_3$ type refractory.

The refractory wall cooling structure at the upper part of the in-bath smelting reduction furnace will now be explained.

In in-bath smelting reduction, post combustion is promoted in the upper space of the furnace so as to supply the heat required for reduction. As a result, the temperature of the gas in the upper space becomes extremely high. Further, the inner surface of the furnace wall is constantly wetted by spattered slag and this facilitates impregnation of the refractory with slag and elution of materials from the refractory. As refractory wear proceeds, therefore, the composition of the slag is thus changed by the incorporation of MgO or $Al_2O_3$.

This means that large quantities of fluxes have to be supplied throughout the entire period of operation in order to maintain the aforesaid composition of the slag.

The inventors therefore propose that the portion of the refractory wall above the slag surface be cooled or that a major part of this portion be constituted of a cooling structure without a refractory lining.

For cooling the refractory wall it is possible to carry out water cooling or cooling by the spraying of mist from the furnace exterior (through the furnace shell) or to embed one or more pipes through the refractory and supply coolant into the pipe(s). In this latter case, $CO_2$, $N_2$ or the off-gas produced in the furnace can be used as the coolant to be supplied to the pipe(s). The cooling effect can be further enhanced by using a mist obtained by adding water to such a coolant gas.

It is also possible to blow a gas, water or a powder directly onto the furnace wall from the inside of the furnace. Any of the aforesaid methods can be used.

Ideally, the cooled area should be made as large as possible and the cooling strength as intense as possible. However, since cooling on too extensive a scale results in prohibitively high construction and operational costs, it is preferable to restrict the cooling to the minimum necessary. In the experience of the inventors, it is necessary to employ a cooling strength of not less than 20,000 $kcal/m^2 \cdot h$ and to cool at least the lower half of the region between the upper surface of the slag and the furnace mouth.

The cooling structure not using refractory may be of any arrangement insofar as it is capable of providing a high cooling strength. For instance, the stave type cooling structure used in blast furnaces or the water cooled panel type cooling structure used in electrical furnaces are easy to install. The material of the cooling structure can be any of cast iron, copper, titanium or the like.

The aspect of the invention under discussion is characterized by conducting the operation stably at a low temperature. If the low temperature of the tapped hot metal produced in accordance with this aspect of the invention should cause any problem in connection with its handling in subsequent processes, as a method for raising its temperature to the required level it is possible to first produce a prescribed amount of hot metal by the low temperature in-bath smelting reduction operation and then to raise the temperature of the produced hot metal by reducing or discontinuing the supply of only the ore to the furnace.

In accordance with this aspect of the invention, it is possible to conduct operation stably at a temperature of not more than 1420° C., to hold the wear rate of the refractory at the furnace bottom to not more than 0.5 mm/h, and, moreover, to achieve a high kinetic coefficient such as has been possible with prior art techniques only at a temperature of 1500° C. or higher.

It is also possible to suppress iron dust generation, realize an improved heat balance and obtain good productivity and a favorable unit consumption of coal. Further, since the slag produced by the operation can be used as a cement or road bed material, the total cost for hot metal production is greatly reduced in comparison with that according to conventional methods.

EXAMPLE 1

The specifications of the equipment used for the operation were as follows:

| | |
|---|---|
| Furnace volume | Max. 120 t metal bath |
| Hot metal weight | Min. 60 t at start |
| Slag weight | 30 t at start |
| Hot metal temp. | 1500° C. |
| Materials | Ore: Lump ore |
| | Coal: Lump fuel coal |
| | Auxiliary carbon material: |
| | Lump fuel coal char |

Operation according to two conventional methods and operation according to the method of this invention were compared. In all three types of operation, the oxygen flow rate was set at a standard value of 25,000 $Nm^3/h$ and the target carbon material content of the slag was set at 33% of the slag weight. The operations were conducted for two hours each, and the occurrence of slopping, the unit consumption and the production rate were observed and compared.

In the first conventional method of operation the ratio between the oxygen and coal supply rates was set on the basis of the production rate and post combustion ratio predicted prior to the start of operation and this ratio was maintained up to the end of the operation. In the second conventional method of operation, the amount of discharged carbon was continuously calculated from, on the one hand, the amount of carbon supplied in the form of coal and fluxes such as limestone and, on the other hand, the flow rate and composition of the off-gas, and the calculated value was used to determine the carbon material content of the slag.

In the operation according to the method of this invention, the apparent density of the slag was controlled to within the range of 0.4–0.7 presuming the state of slag swelling in the case of a predicted rate of CO production in the furnace of about 20,000 $Nm^3/h$. This was based on the results of a study conducted beforehand showing that the carbon content of the slag falls within the range of 10–200% of the slag weight when the apparent slag density is within this range.

The results obtained by the conventional methods and the method of this invention are compared in Tables 2 and 3.

The apparent density of the slag was determined by measuring changes in the slag height from variation in the conductivity between the electrodes of a probe mounted on a sub-lance and carrying out a calculation based on the so-obtained value, the slag weight and the slag profile within the furnace.

The calculation was conducted once every five minutes and the result was used for calculating the slag density and the rate of change in slag density at that point in time. The carbon content of the slag was then estimated from the calculated values and the amount of CO gas being produced at that time.

The standard conditions in these operations were:

Oxygen supply rate: Controlled within ±5000 Nm³/h of standard rate of 25,000 Nm³/h Ore supply rate: Controlled with respect to a medium rate of 40–45 t/h based on the carbon material content of the slag and the hot metal temperature Coal supply rate: About 35 t/h, controlled on the basis of slag carbon material content Auxiliary carbon materials: Supplied at the time the estimated slag carbon material content fell below 20% of the slag weight, in such amount as to increase this value to 33%

TABLE 2

|  | Conventional Method | | Invention Slag height measurement method |
|---|---|---|---|
|  | Initial settings only | Off-gas based control |  |
| No. of tests | 12 | 11 | 10 |
| Carbon material content (%) | | | |
| Average | 35 | 33 | 31 |
| Stan. deviation | 22 | 10 | 4 |
| Slopping ratio (%) | 33 | 18 | 0 |

TABLE 3

|  | Conventional Method | | Invention |
|---|---|---|---|
|  | Initial settings only | Off-gas based control | Slag height measurement method |
| Average production rate (t/h) | 25.8 | 26.9 | 31.6 |
| Kinetic coefficient* | 0.091 | 0.105 | 0.122 |
| Average post combustion (%) | 34 | 37 | 42 |
| Unit consumption of coal (kg/t) | 1290 | 1210 | 1110 |

*Coefficient of reduction rate per unit area of metal bath.
Unit: kmol - $O_2/m^2$/min/(T. Fe)

From these results, it will be noted that the conventional methods of operation suffered such problems as an impossibility to maintain the slag-carbon material mixing ratio within appropriate limits, a high probability of operation becoming impossible because of frequent slopping, and an impossibility of efficiently utilizing the carbon materials in the slag for in-bath reduction and post combustion, and that, as a result, it was not possible to maintain the production rate, unit consumption of coal and other operating factors at favorable levels.

In the operation in accordance with this invention, however, the carbon material content of the slag was controlled with high accuracy, there was absolutely no interruption of the operation because of slopping during the two hours of continuous operation, and the operation could be continued stably over long period of time. Moreover, since the carbon materials in the slag could be effectively utilized for reduction and post combustion, the production rate and post combustion ratio were higher than in operation according to the conventional method so that economical production at a lower unit consumption of coal became possible.

EXAMPLE 2

The in-bath smelting reduction furnace illustrated in FIG. 1 was used in this Example.

Hot metal was produced in the in-bath smelting reduction furnace under the various operating conditions shown in Table 4. In the examples according to the present invention shown in Table 4, the comparisons among the respective bottom bubbled gas flow rates, the agitation forces, the depths of the cavities caused by the top-blown oxygen jet and the thicknesses of the iron condensed zone as well as the slag weight are all based on the results of operation in accordance with the present invention.

Example 2-1 relates to a standard operation in which nitrogen gas, which does not react with the metal bath, was bottom bubbled and the interior of the furnace was at atmospheric pressure. In Example 2-2, the interior of the furnace was at 2 atmospheres. While under this condition the agitation gas flow rate, as indicated according to the ordinary method of conversion (Nm³/h), exceeded the upper limit on the bottom bubbled gas flow rate per tuyere prescribed by this invention, the flow rate as compensated for the furnace internal pressure (equivalent flow rate in standard operation state: Q) was within the operating condition of the invention. In Example 2-3, carbon dioxide bubbled as an agitation gas reacted with carbon in the metal bath to produce carbon monoxide and double its volume in the metal bath.

In all of these examples, the post combustion ratio was a relatively high 43–46% and the heat transfer efficiency was 90% or higher. The amount of iron dust generated was not more than 3% of the amount of hot metal produced. The amount of carbon dust generated was also at a low level of about 5–7%. As a result of this operation under favorable post combustion and dust generation conditions, there was achieved a unit consumption of coal of not more than 1000 kg/t.

In Comparative Example 1 according to the prior art, on the other hand, the high agitation gas flow rate per tuyere of 650 Nm³/h led to heavy iron dust production at the rate of 85.4 kg/t and since the metal yield was poor, the unit consumption of coal exceeded 1000 kg/t.

Comparative Example 2 relates to a case in which the operation was carried out at a furnace internal pressure of two atmospheres and the equivalent flow rate per tuyere in standard operation state (Q) exceeded the upper limit of 450 Nm³/h even after compensation for pressure. As a result, the rate of iron dust generation became a high 98.7 kg/t and the unit consumption of coal was poor.

In Comparative Example 3 carbon dioxide gas was bubbled to react with carbon in the metal bath and double its volume. The gas flow per tuyere was within the range of the invention insofar as the reaction in the iron bath was not taken into consideration but Q was higher than the upper limit of this range when the reaction was taken into account. The amount of dust produced in the Comparative Example 3 operation was a high 100 kg/t or more and the unit consumption of coal was over 1100 kg/t. The results of this operation made it clear that in setting the upper limit of the bottom bubbled gas flow rate it is necessary to take the change in volume caused by the reaction in the metal bath into account.

Comparative Example 4 is an example of operation at a low agitation force and a consequently poor heat transfer efficiency. In this operation, the metal bath agitation was only 0.8 kW/t, which is lower than the 1 kW/t stipulated by the present invention. Since at 79% the heat transfer efficiency was lower in this Comparative Example than in the other operations, the unit consumption of coal was an extremely low 1295 kg/t, making it impossible to carry out economical hot metal production.

In Comparative Example 5 the gas flow rate per tuyere satisfied the requirement of the present invention but since the number of tuyeres was large (6), the metal bath agitation force came to exceed 6 kW/t. As a result, the rate of iron dust generation became a high 120 kg/t or thereabouts.

Comparative Example 6 relates to an operation in which the cavity formed in the slag by the jet of top blown oxygen reached to within the thickness T of the iron condensed zone produced by the bottom bubbled gas injected for agitation. In this operation, the oxygen came in contact with the iron droplets and blew them into the generated gas. At the same time, the top blown oxygen caused the carbon monoxide generating from the metal bath to burn and the resulting carbon dioxide reacted with carbon contained in the iron droplets, thus reverting to carbon monoxide. As a result, there was heavy iron dust production, the post combustion ratio was low, the rate of iron dust generation was about 100 kg/t and the unit consumption of coal was a high 1251 kg/t.

Comparative Example 7 is an example of operation with a small amount of slag. While the results in this operation were good as regarded post combustion and iron dust, since at 1200 kg/m² the slag weight was below the lower limit of 2000 kg/m² required in this invention, the amount of dust generated reached 15% of the weight of the supplied coal and the resulting loss of coal pushed the unit consumption of coal down to 1150 kg/t. In addition to the poor unit consumption of coal, moreover, the reduction in the amount of carbon material suspended in the slag that resulted from its entrainment by the coal gas led to abnormal slag foaming that made it impossible to continue the operation.

As can be seen from the foregoing, conducting operation under conditions falling outside of those stipulated by the present invention resulted in a lower post combustion ratio, a lower heat transfer efficiency, increased iron dust generation, and increased carbon dust generation, so that operating costs were increased to the point of making economical production of hot metal impossible. In contrast, in Examples 2-1 to 2-3 conducted in accordance with the requirements of this invention, there was little generation of iron or carbon material dust and the in-bath smelting reduction operation could be conducted effectively at a favorable post combustion ratio and a good heat transfer.

TABLE 4

|  | Invention Examples | | | Prior art comparative examples | | | | | | |
| --- | --- | --- | --- | --- | --- | --- | --- | --- | --- | --- |
|  | No. 2-1 | No. 2-2 | No. 2-3 | No. 1 | No. 2 | No. 3 | No. 4 | No. 5 | No. 6 | No. 7 |
| Hot metal weight (t) | 88 | 90 | 65 | 86 | 110 | 98 | 85 | 75 | 95 | 110 |
| Slag wt (kg/m²) | 1700 | 2400 | 1900 | 1700 | 1600 | 1600 | 2400 | 1900 | 2500 | 1200 |
| Slag thickness | | | | | | | | | | |
| $L_O$ (mm) | 3100 | 4200 | 3200 | 3100 | 2400 | 3100 | 4200 | 3200 | 4100 | 2000 |
| L (mm) | 2100 | 3000 | 2400 | 2000 | 1100 | 2200 | 3000 | 2100 | 3600 | 1100 |
| Agitation gas | $N_2$ | $N_2$ | $CO_2$ | $N_2$ | $N_2$ | $CO_2$ | $N_2$ | $N_2$ | $N_2$ | $N_2$ |
| Volumetric change | 1 | 1 | 2 | 1 | 1 | 2 | 1 | 1 | 1 | 1 |
| Furnace pressure (atm.) | 1.0 | 2.0 | 1.0 | 1.0 | 2.0 | 1.0 | 1.0 | 1.0 | 1.0 | 1.0 |
| Agit. gas flow rate (Nm³/h) | 1000 | 1600 | 600 | 1300 | 2400 | 700 | 350 | 2400 | 1000 | 1400 |
| Bottom bubbling tuyeres | 4 | 2 | 4 | 2 | 2 | 2 | 1 | 6 | 4 | 4 |
| Gas flow rate per tuyere (Nm³/h) | 250 | 800 | 150 | 650 | 1200 | 350 | 350 | 400 | 250 | 350 |
| Q (Nm³/h) | 250 | 400 | 300 | 650 | 600 | 700 | 350 | 400 | 250 | 350 |
| T (mm) | 553 | 700 | 606 | 892 | 857 | 926 | 655 | 700 | 553 | 655 |
| $L_O$-L (mm) | 1050 | 1200 | 800 | 1120 | 970 | 1050 | 1200 | 1100 | 500 | 900 |
| Agitation force (kW/t) | 2.2 | 2.0 | 3.4 | 2.9 | 2.6 | 3.0 | 0.8 | 6.2 | 2.1 | 2.4 |
| Post combustion ratio (%) | 44 | 46 | 43 | 42 | 45 | 42 | 44 | 42 | 34 | 44 |
| Heat transfer efficiency (%) | 91 | 90 | 93 | 90 | 91 | 90 | 79 | 92 | 90 | 92 |
| Iron dust (kg/t) | 25.7 | 28.3 | 21.7 | 85.4 | 98.7 | 101.4 | 35.4 | 121.4 | 101.2 | 33.1 |
| Carbon material dust (%) | 4.7 | 5.5 | 6.9 | 7.0 | 6.5 | 5.9 | 5.9 | 7.0 | 5.5 | 15.1 |
| Coal unit consumption (kg/t) | 995 | 966 | 990 | 1080 | 1081 | 1108 | 1295 | 1101 | 1251 | 1150 |

EXAMPLE 3

The method according to this invention was conducted using the 100 t in-bath smelting reduction furnace shown in FIG. 14. The type and structure of the refractories used during different periods of the operation are shown in Table 5, while the operating conditions used throughout are set out in Table 6.

TABLE 5

| Period 1 | Refractory fabricated of ordinary refractory brick Refractory not cooled Refractory material: Magnesia-C |
| --- | --- |
| Period 2 | Refractory at upper furnace cooled Refractory material: Magnesia-C Cooling method: Water cooling of furnace shell at 12,000 kcal/h/m² and cooling at 10,000 kcal/h/m² with $N_2$ passed through pipes embedded in refractory |
| Period 3 | Upper furnace formed of steel water cooling panels Refractory material: Portion from slag downward formed of alumina-C Cooling method: Cooling water passed over entire surface of the steel cooling panels to obtain cooling strength of 250,000 kcal/h/m² |

TABLE 6

| Metal bath (t) | 100–120 |
| --- | --- |
| Coal used | Lump fuel coal with volatile matter content of 32% |
| Ore used | Lump ore with T. Fe of 65.1% |
| Fluxes | Lime, Burnt dolomite |
| Material supply method | Charged from overhead hopper |
| Post combustion ratio (%) | 40–45 |
| Oxygen flow rate (Nm³/h) | 30,000 |

TABLE 6-continued

| | |
|---|---|
| Production rate (t/h) | 35–45 |
| Bottom bubbled gas agitation | Agitation force: 2–4 kW/t |

The results of the operations during the respective periods are shown in Table 7.

TABLE 7

| | Invention Examples | | Comparative Examples | | |
|---|---|---|---|---|---|
| | No. 3-1 | No. 3-2 | No. 8 | No. 9 | No. 10 |
| Hot metal temp. (°C.) | 1380 | 1400 | 1500 | 1395 | 1405 |
| Slag weight (kg/m$^2$) | 2400 | 2100 | 1800 | 1500 | 2160 |
| Slag basicity | 1.30 | 1.30 | 1.25 | 1.25 | 1.45 |
| Apparent kinetic coefficient | 0.14 | 0.15 | 0.16 | 0.055 | 0.12 |
| Production rate (t/h) | 45 | 44 | 38 | 40 | 43 |
| Slag (T. Fe) (%) | 5.5 | 5.1 | 4.6 | 11.9 | 6.2 |
| Coat unit consumption (kg/t) | 955 | 940 | 1080 | 991 | 961 |
| Refractory wear rate at furnace bottom (mm/h) | 0.22 | 0.40 | 1.4 | 0.33 | 0.24 |
| Refractory wear rate at slag zone (mm/h) | 0.35 | 0.45 | 1.9 | 0.41 | 0.38 |
| MgO in slag (%) | 8.1 | 7.2 | 19.3 | 15.0 | 7.8 |
| Al$_2$O$_3$ in slag (%) | 15.3 | 16.5 | 9.6 | 11.2 | 16.0 |
| Slopping | None | None | None | After 25 min | After 20 min |
| Operating Campaign | 2nd | 3rd | 1st | 1st | 2nd |

The results of these operations will now be discussed.

In Comparative Example 8, since no cooling was conducted and the operation was carried out at the high temperature of 1500° C., the refractory wear rate was high. As a result, a large amount of MgO was eluted from the refractory, causing the MgO content of the slag to become 19.3% and thus making the slag unusable as a cement material. The heat balance was also poor so that the unit consumption of coal and the production rate were both unfavorable.

In Comparative Example 9, no cooling was conducted but the operation was conducted at a low hot metal temperature of 1395° C. Due to the lack of refractory cooling, the refractory wear at the upper part of the furnace was large notwithstanding the low temperature so that the MgO content of the slag increased and made the slag unusable as a cement material. Further, as the amount of slag was small, the top blown oxygen came in contact with the metal so that the amount of iron dust generated was large, the apparent kinetic coefficient was low and the (T. Fe) content of the slag became high. As a result, slopping occurred and made further operation impossible.

In Comparative Example 10, the operation was conducted using exterior cooling through the upper furnace shell as well as cooling using a structure including pipes embedded in the refractory.

Different cooling structures constituted of carbon steel and stainless steel pipes measuring 2, 4 and 6 mm in diameter and embedded at different regions were tested for effectiveness. As a result it was found that the cooling effect of such pipes can be estimated with good accuracy by a calculation based on a simple heat conduction model using a conductivity coefficient that takes into account the density at which the pipes are embedded, the gas flow rate, the type of refractory and the type of gas. The operation, which was conducted at the low temperature of 1405° C., could not be continued stably over a long period since the CaO/SiO$_2$ became high, giving rise to a solid phase that increased the slag viscosity and degraded its flowability to the extent that slopping occurred.

In Examples 3- and 3-2 according to this invention, the refractory wear rate was small and the MgO content of the slag was held to a low level. It was possible to continue stable low-temperature operation over an extended period, with good productivity and low unit consumption of coal.

In the case of the Comparative Examples No. 8 and No. 9, which were conducted during Campaign 1, the amount of refractory wear at the upper region of the furnace was visibly evident. In contrast, almost no wear could be observed in the case of Examples No. 3-1 and No. 3-2 and Comparative Example No. 10.

We claim:

1. In a method of operating an in-bath smelting reduction furnace in the presence of slag wherein oxygen is blown in from a top lance and agitation gas is bubbled through tuyeres located below a metal bath surface, the improvement which comprises controlling the amount of slag present at a weight per unit area of the bath of not less than 2000 kg/m$^2$.

2. A method according to claim 1, wherein the slag has a height dimension, and the improvement further comprises a step in which the slag height in the furnace is measured and the apparent density of the slag is calculated from the result of the measurement, and a step of introducing at least one of a carbon material, oxygen and an ore at a controlled rate so as to maintain the apparent density of the slag in the furnace within a prescribed range.

3. A method according to claim 2, wherein the ore, the oxygen and the carbon material each have a supply rate, and at least one of the ore supply rate and the oxygen supply rate is controlled in addition to the carbon material supply rate.

4. A method according to claim 2, wherein the carbon material contains no more than 10% volatile matter and is supplied to the furnace when the apparent density of the slag in the furnace falls below the prescribed range.

5. A method according to claim 2, wherein the improvement further comprises bubbling the agitation gas through the tuyeres at an agitation force on the metal bath controlled to fall in the range of 1–6 kW/T, and controlling the agitation gas flow rate per tuyere, after conversion to an equivalent value (Q) in standard operation, to fall in the range of 70–450 Nm$^3$/h, wherein $Q = \alpha \times q/p$ in which $\alpha$: Rate of volumetric change in gas due to reaction in the metal bath (−)
q: Bottom agitation gas flow rate (Nm$^3$/h) per tuyere
p: Operating pressure (ata.) in the furnace.

6. A method according to claim 5, wherein the top lance has a height dimension and multiple nozzles, and the oxygen has a supply rate, and the improvement further comprises controlling at least one of the agitation gas flow rate, the lance height, the oxygen supply rate and the shape of the nozzles of the top lance so that a cavity having a depth (L) is produced in the slag by the top blown oxygen and the slag has a thickness ($L_0$) which satisfies the equation $$L_0 - L < 35(a \times q/p)^{\frac{1}{2}}$$

where $a$: Bottom agitation gas flow rate ($Nm^3/h$) per tuyere
$p$: Operating pressure (ata.) in the furnace.

7. A method according to claim 1, wherein the slag contains CaO, $SiO_2$, $Al_2O_3$ and MgO, and the improvement further comprises providing the furnace with a furnace shell lined with refractory, providing the refractory at the upper portion of the furnace with a cooling structure, maintaining the temperature of the metal bath at not more than 1420° C., and maintaining a slag composition within the range of $CaO/SiO_2 = 1.1-1.4$, $Al_2O_3 = 15-25$ wt % and MgO < 13 wt %.

8. A method according to claim 7, wherein ore containing gangue and carbonaceous substances containing ash are present in the furnace, and the improvement further comprises introducing fluxes into the furnace at a ratio of fluxes to the gangue and ash which will maintain the slag composition as defined in claim 7.

* * * * *

UNITED STATES PATENT AND TRADEMARK OFFICE
CERTIFICATE OF CORRECTION

PATENT NO. : 5,078,785

DATED : January 7, 1992

INVENTOR(S) : Tetsuharu Ibaraki et al

It is certified that error appears in the above-identified patent and that said Letters Patent is hereby corrected as shown below:

The drawing sheet consisting of Figs. 4(a) - 4(d) should be deleted to be replaced with the drawing sheets, consisting of Figs. 4(a) - 4(d), as shown on the attached page.

Signed and Sealed this

Thirteenth Day of July, 1993

Attest:

MICHAEL K. KIRK

Attesting Officer

Acting Commissioner of Patents and Trademarks